United States Patent
Fujimoto et al.

(10) Patent No.: US 9,580,541 B1
(45) Date of Patent: Feb. 28, 2017

(54) HIGH PERFORMANCE, DURABLE POLYMERS INCLUDING POLY(PHENYLENE)

(71) Applicant: Sandia Corporation, Albuquerque, NM (US)

(72) Inventors: Cy Fujimoto, Albuquerque, NM (US); Harry Pratt, Albuquerque, NM (US); Travis Mark Anderson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/933,981

(22) Filed: Nov. 5, 2015

Related U.S. Application Data

(60) Provisional application No. 62/075,693, filed on Nov. 5, 2014.

(51) Int. Cl.
*C08G 75/00* (2006.01)
*C08G 61/10* (2006.01)

(52) U.S. Cl.
CPC .................................. *C08G 61/10* (2013.01)

(58) Field of Classification Search
CPC .......... C08G 18/0828; C08G 2261/516; C08G 2261/1452; C08G 2261/722; H01B 1/122; H01M 8/1025
See application file for complete search history.

(56) References Cited

U.S. PATENT DOCUMENTS

| | | |
|---|---|---|
| 7,022,810 B1 | 4/2006 | Cornelius |
| 7,301,002 B1 | 11/2007 | Cornelius et al. |
| 7,582,683 B2 | 9/2009 | Pivovar et al. |
| 7,816,482 B1 | 10/2010 | Hibbs et al. |
| 7,846,980 B2 | 12/2010 | Pivovar et al. |
| 7,875,101 B2 | 1/2011 | Staiger et al. |
| 7,888,397 B1 | 2/2011 | Hibbs et al. |
| 8,110,636 B1 | 2/2012 | Fujimoto et al. |
| 8,227,147 B2 | 7/2012 | Kim et al. |
| 8,492,049 B2 | 7/2013 | Kim et al. |
| 8,530,109 B2 | 9/2013 | Kim et al. |
| 8,809,483 B1 | 8/2014 | Hibbs |
| 9,048,480 B2 | 6/2015 | Kim et al. |
| 9,051,431 B2 | 6/2015 | Kim et al. |

(Continued)

OTHER PUBLICATIONS

Akiko O et al., "Electrophilic aromatic aroylation with $CF_3$-bearing arenecarboxylic acid derivatives: Reaction behavior and acidic mediator dependence," *Synth. Commun.* 2007;37:2701-15.

(Continued)

*Primary Examiner* — Shane Fang
(74) *Attorney, Agent, or Firm* — Helen S. Baca

(57) ABSTRACT

The present invention relates to functionalized polymers including a poly(phenylene) structure. In some embodiments, the polymers and copolymers of the invention include a highly localized concentration of acidic moieties, which facilitate proton transport and conduction through networks formed from these polymers. In addition, the polymers can include functional moieties, such as electron-withdrawing moieties, to protect the polymeric backbone, thereby extending its durability. Such enhanced proton transport and durability can be beneficial for any high performance platform that employs proton exchange polymeric membranes, such as in fuel cells or flow batteries.

22 Claims, 18 Drawing Sheets

(I)

(Ia)

(56) References Cited

U.S. PATENT DOCUMENTS

2012/0225371 A1    9/2012    Kim et al.

OTHER PUBLICATIONS

Fujimoto C et al., "Backbone stability of quaternized polyaromatics for alkaline membrane fuel cells," *J. Membrane Sci.* 2012;(423-424):438-49.

Fujimoto C et al., "Vanadium redox flow battery efficiency and durability studies of sulfonated Diels Alder poly(phenylene)s," *Electrochem. Commun.* 2012;20:48-51.

Fujimoto CH et al., "Ionomeric poly(phenylene) prepared by Diels-Alder polymerization: Synthesis and physical properties of a novel polyelectrolyte," *Macromolecules* 2005;38:5010-6.

Hibbs MR et al., "Synthesis and characterization of poly(phenylene)-based anion exchange membranes for alkaline fuel cells," *Macromolecules* 2009;42:8316-21.

Hibbs MR, "Alkaline stability of poly(phenylene)-based anion exchange membranes with various cations," *J. Polym. Sci. B* 2013;51:1736-42.

Hickner MA et al., "Transport in sulfonated poly(phenylene)s: Proton conductivity, permeability, and the state of water," *Polymer* 2006;47:4238-44.

Kim DS et al., "Resonance stabilized perfluorinated ionomers for alkaline membrane fuel cells," *Macromolecules* 2013;46(19):7826-33.

Jakoby K et al., "Palladium-catalyzed phosphonation of polyphenylsulfone," *Macromol. Chem. Phys.* 2003;204:61-7.

Li N et al., "Polymer electrolyte membranes derived from new sulfone monomers with pendent sulfonic acid groups," *Macromolecules* 2010;43:9810-20.

Lim Y et al., "Synthesis and properties of sulfonated poly(phenylene sulfone)s without ether linkage by Diels-Alder reaction for PEMFC application," *Electrochim. Acta* 2014;119:16-23.

Maalouf M et al., "Factors enabling high mobility of protons and water in perfluorosulfonate membranes under low hydration conditions," *Int'l J. Hydrogen Energy* 2014;39:2795-800.

Merle G et al., "Anion exchange membranes for alkaline fuel cells: A review," *J. Membrane Sci.* 2011;377:1-35.

Parcero E et al., "Phosphonated and sulfonated polyphenylsulfone membranes for fuel cell application," *J. Membr. Sci.* 2006;285:206-13.

Poppe D et al., "Carboxylated and sulfonated poly(arylene-co-arylene sulfone)s: thermostable polyelectrolytes for fuel cell applications," *Macromolecules* 2002;35:7936-41.

Skalski TJG et al., "Structurally-defined, sulfo-phenylated, oligophenylenes and polyphenylenes," *J. Am Chem. Soc.* 2015;137(38):12223-6.

Stanis RJ et al., "Evaluation of hydrogen and methanol fuel cell performance of sulfonated diels alder poly(phenylene) membranes," *J. Power Sci.* 2010;195:104-10.

Sun C-N et al., "Evaluation of Diels-Alder poly(phenylene) anion exchange membranes in all-vanadium redox flow batteries," *Electrochem. Commun.* 2014;43:63-6.

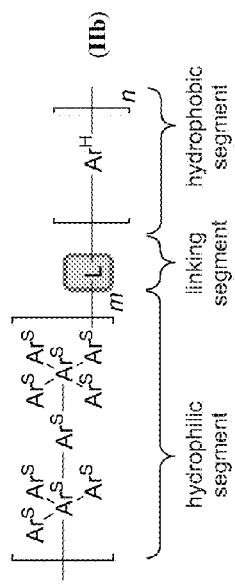
FIG. 4A
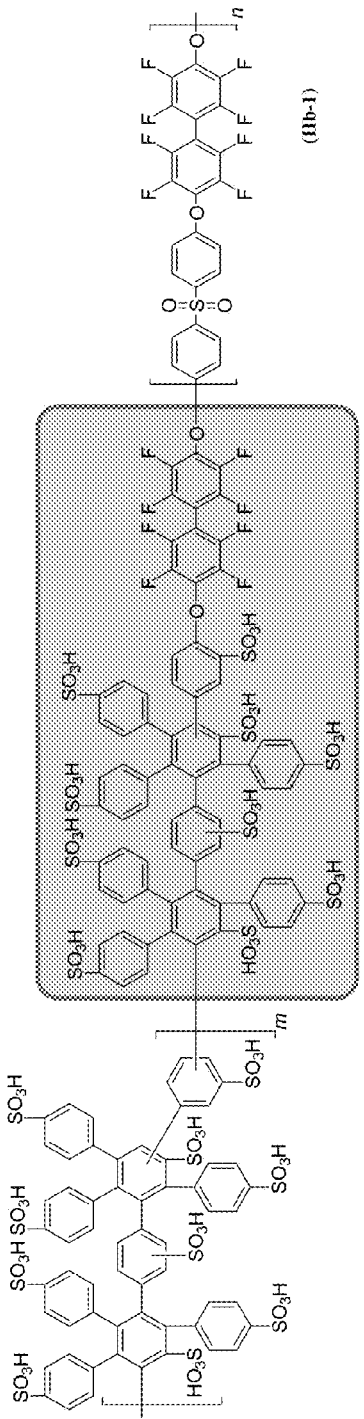
FIG. 4B
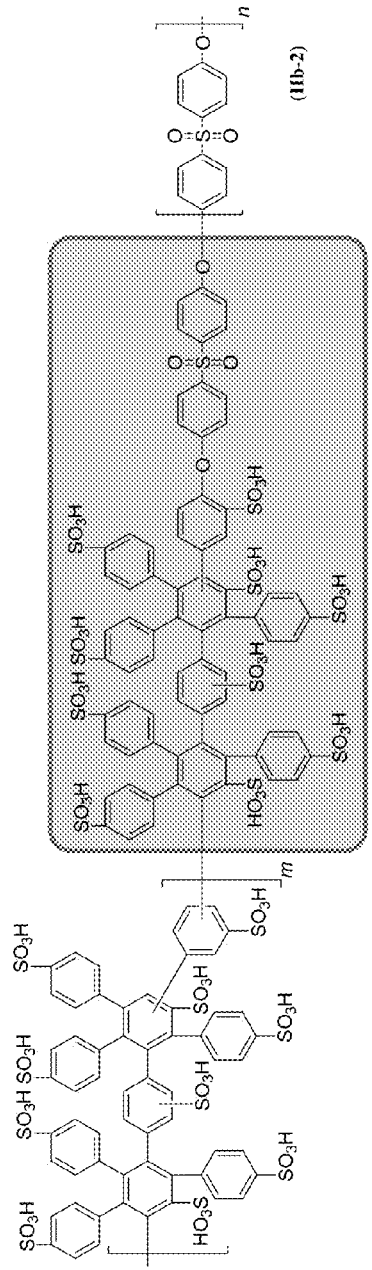

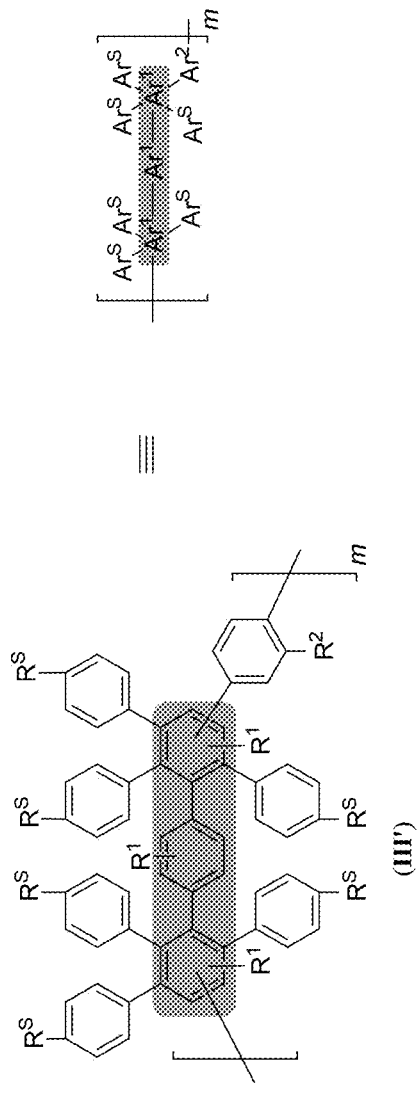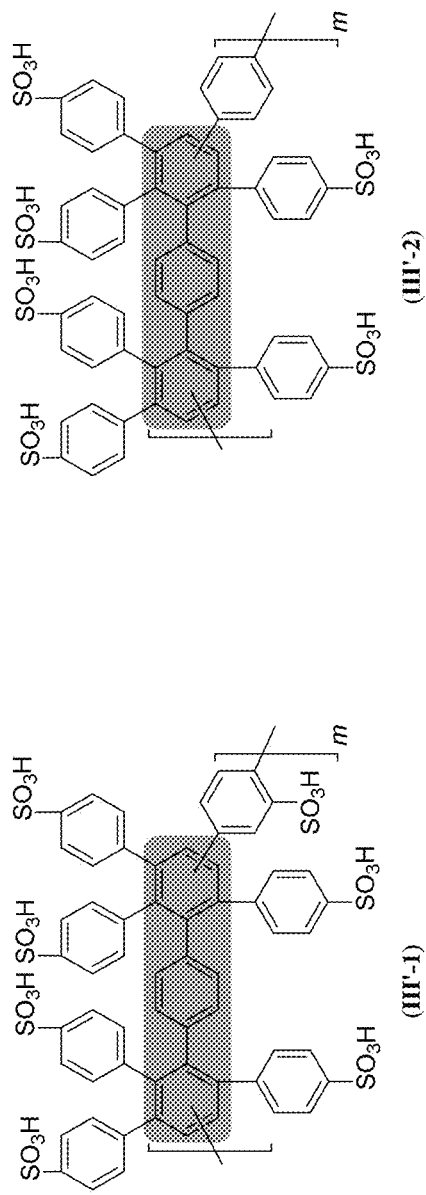
FIG. 6A
FIG. 6B both pendent and backbone positions sulfonated, providing fully-sulfonated SDAPP (FS-SDAPP)

only pendent positions sulfonated in SDAPP polymer

HIGH PERFORMANCE, DURABLE POLYMERS INCLUDING POLY(PHENYLENE)

CROSS-REFERENCE TO RELATED APPLICATION

This application claims the benefit of U.S. Provisional Application No. 62/075,693, filed Nov. 5, 2014, which is hereby incorporated by reference in its entirety.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to functionalized polymers including a poly(phenylene) structure. The structure can include any useful modifications, such as one or more acidic moieties and/or electron-withdrawing moieties. Methods and uses of such polymers are also described herein.

BACKGROUND OF THE INVENTION

Membrane separators are key components in batteries and fuel cells. Currently, Nafion®, a perfluorinated polymer, is the current state of the art. However, Nafion® is costly. Non-fluorinated, hydrocarbons are more cost-efficient, yet exhibit poor oxidative stability, which in turn negatively impacts its durability. Thus, additional compositions are needed to provide improved polymers having enhanced oxidative stability without sacrificing performance. In particular, such improvements should allow the user to control or tune the amount or extent of the fluorinated or hydrophobic components of the polymer.

SUMMARY OF THE INVENTION

The present invention relates to polymer compounds and compositions having a poly(phenylene) structure with modifications useful to promote proton conduction and/or to enhance durability by reducing oxidative damage. For instance, acidic moieties attached to the polymer backbone provide sites to transport protons. In addition, electron-withdrawing moieties can be installed on structural sites that could possibly undergo oxidative attack (e.g., by one or more metal cations, such as vanadium cations). Both types of moieties (e.g., acidic and electron-withdrawing moieties) can be present on the same polymer structure (e.g., in the same or different polymer segment), thereby providing both enhanced performance and durability.

The present invention also includes polymers having different types of segments (e.g., hydrophilic, hydrophobic, fluorophilic, lipophilic, etc. segments). In particular embodiments, when the polymer includes both hydrophilic and hydrophobic segments (e.g., such as in a copolymer), the ratio of these two segments can be controlled. Enhanced control, in part, can allow the user to tune this ratio, where the optimal ratio will minimize swelling of the polymer by water or another aqueous solvent. For instance, minimizing the hydrophilic segment will generally minimize swelling. Of course, if proton conduction is desired, the hydrophilic segment is the portion that provides functional groups or moieties (e.g., acidic moieties) that promote hopping or transport of protons. Thus, a skilled artisan would understand that the ratio of the hydrophilic and hydrophobic segments can be optimized to provide maximal proton conduction while minimizing swelling.

Accordingly, in one aspect, the present invention features a composition (e.g., a molecule, a monomer, a polymer, an article, etc.) including the formula (I), having the formula (I), or including a structure having the formula (I):

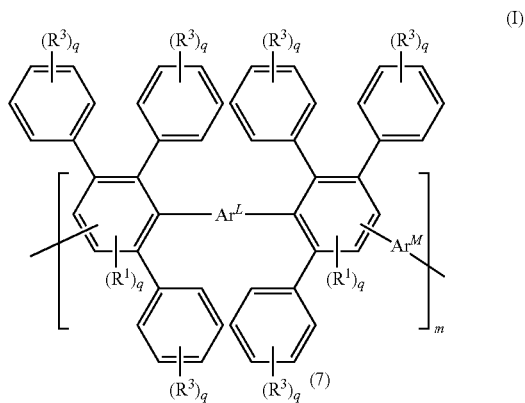

or a salt thereof (e.g., a cationic salt, such as a sodium salt).

In some embodiments, each $R^3$ is, independently, H, optionally substituted $C_{1-12}$ alkyl, optionally substituted $C_{1-12}$ haloalkyl, optionally substituted $C_{1-12}$ perfluoroalkyl, $R^S$, $R^P$, $R^C$, or $R^F$, where $R^S$ is an acidic moiety including a sulfonyl group, $R^P$ is an acidic moiety including a phosphoryl group, $R^C$ is an acidic moiety including a carbonyl group, and $R^F$ is an electron-withdrawing moiety; each $Ar^L$ is, independently, a bivalent linker including optionally substituted arylene; each $R^1$ is, independently, H, $R^S$, $R^P$, $R^C$, or $R^F$; each $Ar^M$ is, independently, a bivalent linker including optionally substituted arylene; each q is, independently, an integer of from 1 to 5; m is an integer of from about 1 to 500. In further embodiments, at least one $R^1$ or $Ar^L$ in formula (I) includes $R^S$, $R^P$, $R^C$, or $R^F$. In some instances, q for $R^1$ is 1.

In some embodiments, each and every $R^3$ is, independently, $R^S$, $R^P$, $R^C$, or $R^F$.

In other embodiments, $R^S$ is —$SO_2$—OH, —$SO_2R^{S1}$, —$R^{SA}$—$SO_2$—$R^{S1}$, —$SO_2$—$R^{Ar}$, —$R^{SA}$—$SO_2$—$R^{Ar}$, —$SO_2NR^{N1}R^{N2}$, —$N(R^{N1})$—$SO_2$—$R^{S3}$, —$SO_2$—$NR^{N1}$—$R^{S2}$, or —$SO_2$—$NR^{N1}$—$SO_2$—$R^{S3}$ (e.g., where each of $R^{S1}$, $R^{S2}$, $R^{S3}$, $R^{Ar}$, $R^{SA}$, $R^{N1}$, and $R^{N2}$ is any described herein).

In some embodiments, $R_C$ is —$CO_2H$, —$C(O)$—$R^{C1}$, or —$R^{CA}$—$C(O)$—$R^{C1}$ (e.g., where each of $R^{C1}$ and $R^{CA}$ is any described herein).

In some embodiments, $R^P$ is —$P(O)(OH)_2$, —$O$-$PO(OH)_2$, —$P(O)HR^{P1}$, —$P(O)<R^{P1}R^{P2}$, —$P(O)<R^{Ar}R^{P2}$, —$P(O)<R^{Ar}R^{Ar}$, —$R^{PA}$-$P(O)<R^{P1}R^{P2}$, —$R^{PA}$-$P(O)<R^{Ar}R^{P2}$, —$R^{PA}$-$P(O)<R^{Ar}R^{Ar}$, —$O$-$P(O)<R^{P1}R^{P2}$, —$O$-$P(O)<R^{Ar}R^{P2}$, or —$O$-$P(O)<R^{Ar}R^{Ar}$ (e.g., where each of $R^{P1}$, $R^{P2}$, $R^{Ar}$, and $R^{PA}$ is any described herein, and where each $R^{Ar}$ can be the same or different).

In some embodiments, $R^F$ is optionally substituted $C_{7-11}$ aryloyl, optionally substituted $C_{6-18}$ aryl, carboxyaldehyde, optionally substituted $C_{2-7}$ alkanoyl, optionally substituted $C_{1-12}$ alkyl, optionally substituted $C_{1-12}$ haloalkyl, optionally substituted $C_{2-7}$ alkoxycarbonyl, nitro, cyano, sulfo, carboxyl, and quaternary ammonium (e.g., any described herein). In other embodiments, $R^F$ includes or is substituted by perfluoroalkyl (e.g., $C_{1-12}$ perfluoroalkyl).

In some embodiments, the composition further includes the structure having the formula (I) covalently bonded to a structure having the formula (III'):

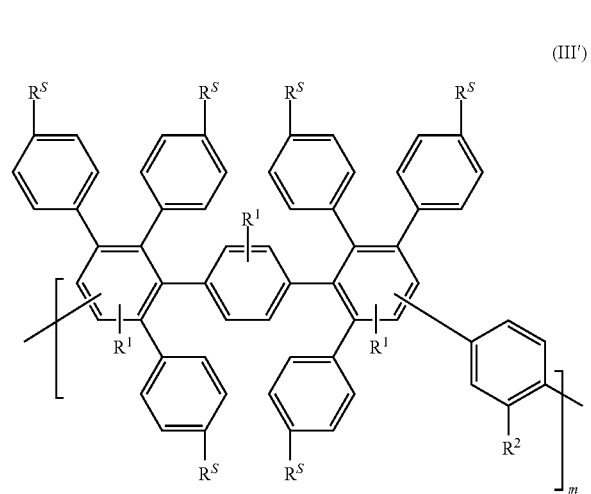

(III')

or a salt thereof, by way of a linking segment L (e.g., any described herein). In some embodiments, each $R^1$ is, independently, H, $R^S$, $R^P$, $R^C$, or $R^F$. In other embodiments, each $R^2$ is, independently, H, $R^S$, $R^P$, $R^C$, $R^F$, halo, optionally substituted $C_{1-12}$ alkyl, optionally substituted $C_{1-12}$ haloalkyl, optionally substituted $C_{1-12}$ perfluoroalkyl, or a label (e.g., any described herein). In yet other embodiments, each of $R^S$, $R^1$, $R^2$, and m is, independently, any described herein.

In another aspect, the present invention features a composition (e.g., a molecule, a monomer, a polymer, an article, etc.) including the formula (II), having the formula (II), or including a structure having the formula (II):

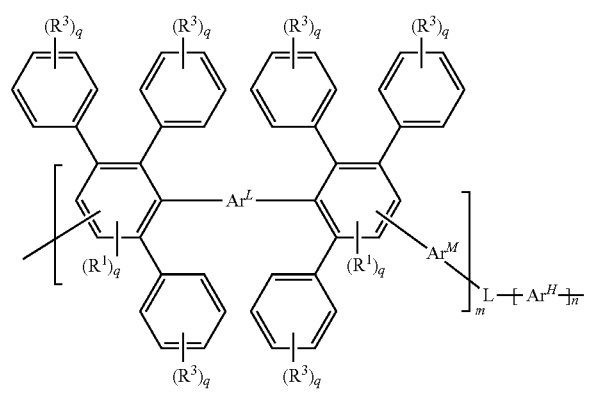

(II)

or a salt thereof (e.g., a cationic salt, such as a sodium salt). In some embodiments, each of $R^3$, $Ar^L$, $R^1$, $Ar^M$, q, m, n, L, and $Ar^H$ is, independently, any described herein. In some embodiments, each of m and n is, independently, an integer of from about 1 to 500; L is a linking segment; and $Ar^H$ is a hydrophobic segment. In further embodiments, at least one $R^1$ or $Ar^L$ in formula (II) includes $R^S$, $R^P$, $R^C$, or $R^F$.

In yet another aspect, the present invention features a composition (e.g., a molecule, a monomer, a polymer, an article, etc.) including the formula (IV), having the formula (IV) or including a structure having the formula (IV):

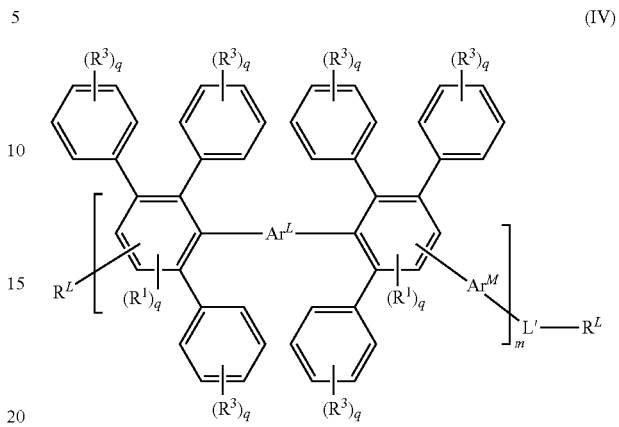

(IV)

or a salt thereof (e.g., a cationic salt, such as a sodium salt). In some embodiments, each of $R^3$, $Ar^L$, $R^1$, $Ar^M$, q, m, L', and $R^L$ is, independently, any described herein. In some embodiments, each $R^L$ is, independently, a electrophilic reactive end group (e.g., any herein, such as optionally substituted $C_{7-11}$ aryloyl or optionally substituted $C_{6-18}$ aryl).

In another aspect, the present invention features a method of forming a polymer, the method including reacting the composition of formula (IV) (e.g., including the formula (IV), having the formula (IV) or including a structure having the formula (IV)) with a reagent having the structure of formula (V):

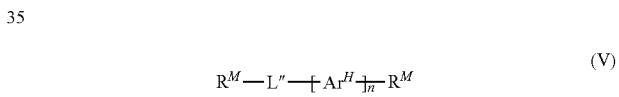

(V)

or a salt thereof. In some embodiments, each $R^M$ is, independently, a nucleophilic reactive end group; L'' is a sublink; $Ar^H$ is a hydrophobic segment; and n is an integer of from about 1 to 500. In further embodiments, the method promotes a nucleophilic addition reaction of $R^M$ as a nucleophile and $R^L$ as an electrophile in order to provide the polymer.

In some embodiments, the method further includes sulfonating the polymer by attaching one or more $R^S$ (e.g., any $R^S$ described herein).

In some embodiments, the method further includes phosphonating the polymer by attaching one or more $R^P$ (e.g., any $R^P$ described herein).

In some embodiments, the method further includes carbonylating the polymer by attaching one or more $R^C$ (e.g., any $R^C$ described herein).

In other embodiments, the method further includes protecting the polymer by attaching one or more $R^F$ (e.g., any $R^F$ described herein).

In any embodiment herein, L or L' or L'' includes a covalent bond, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, optionally substituted $C_{4-18}$ aryleneoxy, optionally substituted polyphenylene, or a structure of formula (I). In yet other embodiment, L or L' or L'' includes a structure of formula (I) and $Ar^H$ (e.g., any subunits described herein for $Ar^H$).

In any embodiment herein, $Ar^H$ or L or L' or L" includes a structure of formula (I), a sulfone subunit, an arylene sulfone subunit, an ether sulfone subunit, an arylene ether subunit, a perfluoroalkyl subunit, or a perfluoroalkoxy subunit.

In any embodiment herein, each of $Ar^L$, $Ar^M$, and $Ar^H$ is optionally substituted phenylene, optionally substituted naphthylene, optionally substituted phenanthrylene, a sulfone subunit, an arylene sulfone subunit, an ether sulfone subunit, an arylene ether subunit, a perfluoroalkyl subunit, a perfluoroalkoxy subunit, or any described herein (e.g., any aryl group described herein). In further embodiments, the optional substitution is $R^S$, $R^P$, $R^C$, $R^F$, or a label (e.g., fluorine or another NMR detectable label).

In any embodiment herein, m is less than n.

Definitions

As used herein, the term "about" means +/−10% of any recited value. As used herein, this term modifies any recited value, range of values, or endpoints of one or more ranges.

The term "acyl," or "alkanoyl," as used interchangeably herein, represent an alkyl group, as defined herein, or hydrogen attached to the parent molecular group through a carbonyl group, as defined herein. This group is exemplified by formyl, acetyl, propionyl, butanoyl, and the like. The alkanoyl group can be substituted or unsubstituted. For example, the alkanoyl group can be substituted with one or more substitution groups, as described herein for alkyl. In some embodiments, the unsubstituted acyl group is a $C_{2-7}$ acyl or alkanoyl group.

By "alkaryl" is meant an aryl group, as defined herein, attached to the parent molecular group through an alkylene group, as defined herein. Similarly, by the term "alkheteroaryl" is meant a heteroaryl group, as defined herein, attached to the parent molecular group through an alkylene group. Other groups preceded by the prefix "alk-" are defined in the same manner. The alkaryl group can be substituted or unsubstituted. For example, the alkaryl group can be substituted with one or more substitution groups, as described herein for alkyl and/or aryl. Exemplary unsubstituted alkaryl groups are of from 7 to 16 carbons ($C_{7-16}$ alkaryl), as well as those having an alkylene group with 1 to 6 carbons and an aryl group with 4 to 18 carbons (i.e., $C_{1-6}$ alk-$C_{4-18}$ aryl).

By "alkcycloalkyl" is meant a cycloalkyl group, as defined herein, attached to the parent molecular group through an alkylene group, as defined herein. The alkcycloalkyl group can be substituted or unsubstituted. For example, the alkcycloalkyl group can be substituted with one or more substitution groups, as described herein for alkyl.

By "alkenyl" is meant an optionally substituted $C_{2-24}$ alkyl group having one or more double bonds. The alkenyl group can be cyclic (e.g., $C_{3-24}$ cycloalkenyl) or acyclic. The alkenyl group can also be substituted or unsubstituted. For example, the alkenyl group can be substituted with one or more substitution groups, as described herein for alkyl.

By "alkheterocyclyl" represents a heterocyclyl group, as defined herein, attached to the parent molecular group through an alkylene group, as defined herein. Exemplary unsubstituted alkheterocyclyl groups are of from 2 to 14 carbons.

By "alkoxy" is meant —OR, where R is an optionally substituted alkyl group, as described herein. Exemplary alkoxy groups include methoxy, ethoxy, butoxy, trihaloalkoxy, such as trifluoromethoxy, etc. The alkoxy group can be substituted or unsubstituted. For example, the alkoxy group can be substituted with one or more substitution groups, as described herein for alkyl. Exemplary unsubstituted alkoxy groups include $C_{1-3}$, $C_{1-6}$, $C_{1-12}$, $C_{1-16}$, $C_{1-18}$, $C_{1-20}$, or $C_{1-24}$ alkoxy groups.

By "alkoxyalkyl" is meant an alkyl group, as defined herein, which is substituted with an alkoxy group, as defined herein. Exemplary unsubstituted alkoxyalkyl groups include between 2 to 12 carbons ($C_{2-12}$ alkoxyalkyl), as well as those having an alkyl group with 1 to 6 carbons and an alkoxy group with 1 to 6 carbons (i.e., $C_{1-6}$ alkoxy-$C_{1-6}$ alkyl).

By "alkoxycarbonyl" is meant an alkoxy group, as defined herein, that is attached to the parent molecular group through a carbonyl group. In some embodiments, an unsubstituted alkoxycarbonyl group is a $C_{2-7}$ alkoxycarbonyl group.

By "alkyl" and the prefix "alk" is meant a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic (e.g., $C_{3-24}$ cycloalkyl) or acyclic. The alkyl group can be branched or unbranched. The alkyl group can also be substituted or unsubstituted. For example, the alkyl group can be substituted with one, two, three or, in the case of alkyl groups of two carbons or more, four substituents independently selected from the group consisting of: (1) $C_{1-6}$ alkoxy; (2) $C_{1-6}$ alkylsulfinyl; (3) $C_{1-6}$ alkylsulfonyl; (4) amino; (5) aryl; (6) arylalkoxy; (7) aryloyl; (8) azido; (9) cyano; (10) carboxyaldehyde; (11) $C_{3-8}$ cycloalkyl; (12) halo; (13) heterocyclyl; (14) heterocyclyloxy; (15) heterocyclyloyl; (16) hydroxyl; (17) N-protected amino; (18) nitro; (19) oxo; (20) $C_{3-8}$ spirocyclyl; (21) $C_{1-6}$ thioalkoxy; (22) thiol; (23) —$CO_2R^A$, where $R^A$ is selected from the group consisting of (a) hydrogen, (b) $C_{1-6}$ alkyl, (c) $C_{4-18}$ aryl, and (d) $C_{1-6}$alk-$C_{4-18}$ aryl; (24) —$C(O)NR^BR^C$, where each of $R^B$ and $R^C$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (25) —$SO_2R^D$, where $R^D$ is selected from the group consisting of (a) $C_{1-6}$ alkyl, (b) $C_{4-18}$ aryl, and (c) $C_{1-6}$ alk-$C_{4-18}$ aryl; (26) —$SO_2NR^ER^F$, where each of $R^E$ and $R^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; and (27) —$NR^GR^H$, where each of $R^G$ and $R^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group. The alkyl group can be a primary, secondary, or tertiary alkyl group substituted with one or more substituents (e.g., one or more halo or alkoxy). In some embodiments, the unsubstituted alkyl group is a $C_{1-3}$, $C_{1-6}$, $C_{1-12}$, $C_{1-16}$, $C_{1-18}$, $C_{1-20}$, or $C_{1-24}$ alkyl group.

By "alkylene" is meant a bivalent form of an alkyl group, as described herein. Exemplary alkylene groups include methylene, ethylene, propylene, butylene, etc. In some embodiments, the alkylene group is a $C_{1-3}$, $C_{1-6}$, $C_{1-12}$, $C_{1-16}$, $C_{1-18}$, $C_{1-20}$, $C_{1-24}$, $C_{2-3}$, $C_{2-6}$, $C_{2-12}$, $C_{2-16}$, $C_{2-18}$, $C_{2-20}$, or $C_{2-24}$ alkylene group. The alkylene group can be branched or unbranched. The alkylene group can also be substituted or unsubstituted. For example, the alkylene group can be substituted with one or more substitution groups, as described herein for alkyl.

By "alkyleneoxy" is meant an alkylene group, as defined herein, attached to the parent molecular group through an oxygen atom.

By "alkylsulfate" is meant an alkyl group, as defined herein, attached to the parent molecular group through an —O—(SO$_2$)— group. An exemplary alkylsulfate group is —O—SO$_2$-Ak, where each Ak is, independently, optionally substituted alkyl.

By "alkylsulfinyl" is meant an alkyl group, as defined herein, attached to the parent molecular group through an —S(O)— group. In some embodiments, the unsubstituted alkylsulfinyl group is a $C_{1-6}$ or $C_{1-12}$ alkylsulfinyl group.

By "alkylsulfinylalkyl" is meant an alkyl group, as defined herein, substituted by an alkylsulfinyl group. In some embodiments, the unsubstituted alkylsulfinylalkyl group is a $C_{2-12}$ or $C_{2-24}$ alkylsulfinylalkyl group (e.g., $C_{1-6}$ alkylsulfinyl-$C_{1-6}$ alkyl or $C_{1-12}$ alkylsulfinyl-$C_{1-12}$ alkyl).

By "alkylsulfonyl" is meant an alkyl group, as defined herein, attached to the parent molecular group through an —SO$_2$— group. In some embodiments, the unsubstituted alkylsulfonyl group is a $C_{1-6}$ or $C_{1-12}$ alkylsulfonyl group. In other embodiments, the alkylsulfonyl group is —SO$_2$—R$^{S1}$, where R$^{S1}$ is an optionally substituted $C_{1-12}$ alkyl (e.g., as described herein, including optionally substituted $C_{1-12}$ haloalkyl or perfluoroalkyl).

By "alkylsulfonylalkyl" is meant an alkyl group, as defined herein, substituted by an alkylsulfonyl group. In some embodiments, the unsubstituted alkylsulfonylalkyl group is a $C_{2-12}$ or $C_{2-24}$ alkylsulfonylalkyl group (e.g., $C_{1-6}$ alkylsulfonyl-$C_{1-6}$ alkyl or $C_{1-12}$ alkylsulfonyl-$C_{1-12}$ alkyl).

By "alkylsulfonylamide" is meant an amino group, as defined herein, substituted by an alkylsulfonyl group. In some embodiments, the unsubstituted alkylsulfonylamide group is —NR$^{N1}$R$^{N2}$, in which each of R$^{N1}$ and R$^{N2}$ is, independently, H, $C_{1-12}$ alkyl, or $C_{1-24}$ alkylsulfonyl group (e.g., $C_{1-6}$ alkylsulfonyl or $C_{1-12}$ alkylsulfonyl), where at least one of R$^{N1}$ and R$^{N2}$ includes a sulfonyl group. An exemplary alkylsulfonylamide group is —N—(SO$_2$-Ak)$_2$ or —N(Ak)(SO$_2$-Ak), where each Ak is, independently, optionally substituted alkyl.

By "alkynyl" is meant an optionally substituted $C_{2-24}$ alkyl group having one or more triple bonds. The alkynyl group can be cyclic or acyclic and is exemplified by ethynyl, 1-propynyl, and the like. The alkynyl group can also be substituted or unsubstituted. For example, the alkynyl group can be substituted with one or more substitution groups, as described herein for alkyl.

By "amidino" is meant —C(NR$^{N3}$)NR$^{N1}$R$^{N2}$, where each of R$^{N1}$, R$^{N2}$, and R$^{N3}$ is, independently, H or optionally substituted alkyl, or R$^{N1}$ and R$^{N2}$, taken together with the nitrogen atom to which each are attached, form a heterocyclyl group, as defined herein.

By "amido" is meant —C(O)NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group, as defined herein.

By "amino" is meant —NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group, as defined herein.

By "aminoalkyl" is meant an alkyl group, as defined herein, substituted by an amino group, as defined herein.

By "aryl" is meant a group that contains any carbon-based aromatic group including, but not limited to, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one, two, three, four, or five substituents independently selected from the group consisting of: (1) $C_{1-6}$ alkanoyl; (2) $C_{1-6}$ alkyl; (3) $C_{1-6}$ alkoxy; (4) $C_{1-6}$ alkoxy-$C_{1-6}$ alkyl; (5) $C_{1-6}$ alkylsulfinyl; (6) $C_{1-6}$ alkylsulfinyl-$C_{1-6}$ alkyl; (7) $C_{1-6}$ alkylsulfonyl; (8) $C_{1-6}$ alkylsulfonyl-$C_{1-6}$ alkyl; (9) aryl; (10) amino; (11) $C_{1-6}$ aminoalkyl; (12) heteroaryl; (13) $C_{1-6}$ alk-$C_{4-18}$ aryl; (14) aryloyl; (15) azido; (16) cyano; (17) $C_{1-6}$ azidoalkyl; (18) carboxyaldehyde; (19) carboxyaldehyde-$C_{1-6}$ alkyl; (20) $C_{3-8}$ cycloalkyl; (21) $C_{1-6}$ alk-$C_{3-8}$ cycloalkyl; (22) halo; (23) $C_{1-6}$ haloalkyl; (24) heterocyclyl; (25) heterocyclyloxy; (26) heterocyclyloyl; (27) hydroxyl; (28) $C_{1-6}$ hydroxyalkyl; (29) nitro; (30) $C_{1-6}$ nitroalkyl; (31) N-protected amino; (32) N-protected amino-$C_{1-6}$ alkyl; (33) oxo; (34) $C_{1-6}$thioalkoxy; (35) thio-$C_{1-6}$ alkoxy-$C_{1-6}$ alkyl; (36) —(CH$_2$)$_r$CO$_2$R$^A$, where r is an integer of from zero to four, and R$^A$ is selected from the group consisting of (a) hydrogen, (b) $C_{1-6}$ alkyl, (c) $C_{4-18}$ aryl, and (d) $C_{1-6}$ alk-$C_{4-18}$ aryl; (37) —(CH$_2$)$_r$CONR$^B$R$^C$, where r is an integer of from zero to four and where each R$^B$ and R$^C$ is independently selected from the group consisting of (a) hydrogen, (b) $C_{1-6}$ alkyl, (c) $C_{4-18}$ aryl, and (d) $C_{1-6}$ alk-$C_{4-18}$ aryl; (38) —(CH$_2$)$_r$SO$_2$R$^D$, where r is an integer of from zero to four and where R$^D$ is selected from the group consisting of (a) $C_{1-6}$ alkyl, (b) $C_{4-18}$ aryl, and (c) $C_{1-6}$ alk-$C_{4-18}$ aryl; (39) —(CH$_2$)$_r$SO$_2$NR$^E$R$^F$, where r is an integer of from zero to four and where each of R$^E$ and R$^F$ is, independently, selected from the group consisting of (a) hydrogen, (b) $C_{1-6}$ alkyl, (c) $C_{4-18}$ aryl, and (d) $C_{1-6}$ alk-$C_{4-18}$ aryl; (40) —(CH$_2$)$_r$NR$^G$R$^H$, where r is an integer of from zero to four and where each of R$^G$ and R$^H$ is, independently, selected from the group consisting of (a) hydrogen, (b) an N-protecting group, (c) $C_{1-6}$ alkyl, (d) $C_{2-6}$ alkenyl, (e) $C_{2-6}$ alkynyl, (f) $C_{4-18}$ aryl, (g) $C_{1-6}$ alk-$C_{4-18}$ aryl, (h) $C_{3-8}$ cycloalkyl, and (i) $C_{1-6}$ alk-$C_{3-8}$ cycloalkyl, wherein in one embodiment no two groups are bound to the nitrogen atom through a carbonyl group or a sulfonyl group; (41) thiol; (42) perfluoroalkyl; (43) perfluoroalkoxy; (44) aryloxy; (45) cycloalkoxy; (46) cycloalkylalkoxy; and (47) arylalkoxy. In particular embodiments, an unsubstituted aryl group is a $C_{4-18}$, $C_{4-14}$, $C_{4-12}$, $C_{4-10}$, $C_{6-18}$, $C_{6-14}$, $C_{6-12}$, or $C_{6-10}$ aryl group.

By "arylene" is meant a bivalent form of an aryl group, as described herein. Exemplary arylene groups include phenylene, naphthylene, biphenylene, triphenylene, diphenyl ether, acenaphthenylene, anthrylene, or phenanthrylene. In some embodiments, the arylene group is a $C_{4-18}$, $C_{4-14}$, $C_{4-12}$, $C_{4-10}$, $C_{6-18}$, $C_{6-14}$, $C_{6-12}$, or $C_{6-10}$ arylene group. The arylene group can be branched or unbranched. The arylene group can also be substituted or unsubstituted. For example, the arylene group can be substituted with one or more substitution groups, as described herein for aryl.

By "aryleneoxy" is meant an arylene group, as defined herein, attached to the parent molecular group through an oxygen atom.

By "arylalkoxy" is meant an alkaryl group, as defined herein, attached to the parent molecular group through an oxygen atom.

By "aryloxy" is meant —OR, where R is an optionally substituted aryl group, as described herein. In some embodiments, an unsubstituted aryloxy group is a $C_{4-18}$ or $C_{6-18}$ aryloxy group.

By "aryloxycarbonyl" is meant an aryloxy group, as defined herein, that is attached to the parent molecular group through a carbonyl group. In some embodiments, an unsubstituted aryloxycarbonyl group is a $C_{5-19}$ aryloxycarbonyl group.

By "aryloyl" is meant an aryl group that is attached to the parent molecular group through a carbonyl group. In some embodiments, an unsubstituted aryloyl group is a $C_{7-11}$ aryloyl group.

By "arylsulfonyl" is meant an aryl group, as defined herein, attached to the parent molecular group through an —$SO_2$— group.

By "arylsulfonylalkyl" is meant an alkyl group, as defined herein, substituted by an arylsulfonyl group. In some embodiments, the unsubstituted arylsulfonylalkyl group is a $C_{4-18}$ arylsulfonyl-$C_{1-6}$ alkyl group.

By "azido" is meant an —$N_3$ group.

By "azo" is meant an —N=N— group.

By "azidoalkyl" is meant an azido group attached to the parent molecular group through an alkyl group, as defined herein.

By "carbonyl" is meant a —C(O)— group, which can also be represented as >C=O.

By "carboxyaldehyde" is meant a —C(O)H group.

By "carboxyaldehydealkyl" is meant a carboxyaldehyde group, as defined herein, attached to the parent molecular group through an alkylene group, as defined herein.

By "carboxyl" is meant a —$CO_2H$ group.

By "cyano" is meant a —CN group.

By "cycloalkyl" is meant a monovalent saturated or unsaturated non-aromatic cyclic hydrocarbon group of from three to eight carbons, unless otherwise specified, and is exemplified by cyclopropyl, cyclobutyl, cyclopentyl, cyclohexyl, cycloheptyl, bicyclo[2.2.1.]heptyl and the like. The cycloalkyl group can also be substituted or unsubstituted. For example, the cycloalkyl group can be substituted with one or more groups including those described herein for alkyl.

By "cycloalkoxy" is meant a cycloalkyl group, as defined herein, attached to the parent molecular group through an oxygen atom.

By "dithiocarboxyamino" is meant —$NR^{N1}C(S)SR^{S1}$, where each of $R^{N1}$ and $R^{S1}$ is, independently, H or optionally substituted alkyl, or $R^{N1}$ and $R^{S1}$, taken together with the nitrogen atom to which each are attached, form a heterocyclyl group, as defined herein.

By "halo" is meant F, Cl, Br, or I.

By "haloalkyl" is meant an alkyl group, as defined herein, substituted with one or more halo.

By "heteroalkyl" is meant an alkyl group, as defined herein, containing one, two, three, or four non-carbon heteroatoms (e.g., independently selected from the group consisting of nitrogen, oxygen, phosphorous, sulfur, or halo).

By "heteroalkylene" is meant a divalent form of an alkylene group, as defined herein, containing one, two, three, or four non-carbon heteroatoms (e.g., independently selected from the group consisting of nitrogen, oxygen, phosphorous, sulfur, or halo).

By "heteroalkyleneoxy" is meant a heteroalkylene group, as defined herein, attached to the parent molecular group through an oxygen atom.

By "heteroaryl" is meant a subset of heterocyclyl groups, as defined herein, which are aromatic, i.e., they contain 4n+2 pi electrons within the mono- or multicyclic ring system.

By "heterocyclyl" is meant a 5-, 6- or 7-membered ring, unless otherwise specified, containing one, two, three, or four non-carbon heteroatoms (e.g., independently selected from the group consisting of nitrogen, oxygen, phosphorous, sulfur, or halo). The 5-membered ring has zero to two double bonds and the 6- and 7-membered rings have zero to three double bonds. The term "heterocyclyl" also includes bicyclic, tricyclic and tetracyclic groups in which any of the above heterocyclic rings is fused to one, two, or three rings independently selected from the group consisting of an aryl ring, a cyclohexane ring, a cyclohexene ring, a cyclopentane ring, a cyclopentene ring, and another monocyclic heterocyclic ring, such as indolyl, quinolyl, isoquinolyl, tetrahydroquinolyl, benzofuryl, benzothienyl and the like. Heterocyclics include thiiranyl, thietanyl, tetrahydrothienyl, thianyl, thiepanyl, aziridinyl, azetidinyl, pyrrolidinyl, piperidinyl, azepanyl, pyrrolyl, pyrrolinyl, pyrazolyl, pyrazolinyl, pyrazolidinyl, imidazolyl, imidazolinyl, imidazolidinyl, pyridyl, homopiperidinyl, pyrazinyl, piperazinyl, pyrimidinyl, pyridazinyl, oxazolyl, oxazolidinyl, isoxazolyl, isoxazolidiniyl, morpholinyl, thiomorpholinyl, thiazolyl, thiazolidinyl, isothiazolyl, isothiazolidinyl, indolyl, quinolinyl, isoquinolinyl, benzimidazolyl, benzothiazolyl, benzoxazolyl, furyl, thienyl, thiazolidinyl, isothiazolyl, isoindazoyl, triazolyl, tetrazolyl, oxadiazolyl, uricyl, thiadiazolyl, pyrimidyl, tetrahydrofuranyl, dihydrofuranyl, tetrahydrothienyl, dihydrothienyl, dihydroindolyl, tetrahydroquinolyl, tetrahydroisoquinolyl, pyranyl, dihydropyranyl, dithiazolyl, benzofuranyl, benzothienyl, and the like.

By "heterocyclyloxy" is meant a heterocyclyl group, as defined herein, attached to the parent molecular group through an oxygen atom.

By "heterocyclyloyl" is meant a heterocyclyl group, as defined herein, attached to the parent molecular group through a carbonyl group.

By "hydroxyl" is meant —OH.

By "hydroxyalkyl" is meant an alkyl group, as defined herein, substituted by one to three hydroxyl groups, with the proviso that no more than one hydroxyl group may be attached to a single carbon atom of the alkyl group and is exemplified by hydroxymethyl, dihydroxypropyl, and the like.

By "imino" is meant —NH—.

By "nitrilo" is meant —N<. Exemplary nitrilo groups include —$NR^{L3}$—, where $R^{L3}$ is H, optionally substituted alkyl, optionally substituted haloalkyl, optionally substituted alkoxy, optionally substituted alkaryl, optionally substituted aryl, or halo.

By "nitro" is meant an —$NO_2$ group.

By "nitroalkyl" is meant an alkyl group, as defined herein, substituted by one to three nitro groups.

By "oxo" is meant an =O group.

By "oxy" is meant —O—.

By "perfluoroalkyl" is meant an alkyl group, as defined herein, having each hydrogen atom substituted with a fluorine atom. Exemplary perfluoroalkyl groups include trifluoromethyl, pentafluoroethyl, etc.

By "perfluoroalkylene" is meant an alkylene group, as defined herein, having each hydrogen atom substituted with a fluorine atom. Exemplary perfluoroalkylene groups include difluoromethylene, tetrafluoroethylene, etc.

By "perfluoroalkyleneoxy" is meant a perfluoroalkylene group, as defined herein, having an oxy group attached to either end of the perfluoroalkylene group. Exemplary perfluoroalkylene groups include, e.g., —$OC_fF_{2f}$— or —$C_fF_{2f}O$—, where f is an integer from about 1 to 5, and 2f is an integer that is 2 times f (e.g., difluoromethyleneoxy, tetrafluoroethyleneoxy, etc.).

By "perfluoroalkoxy" is meant an alkoxy group, as defined herein, having each hydrogen atom substituted with a fluorine atom.

By "phosphono" is meant a —P(O)(OH)$_2$ group.

By "phosphonoyl" is meant a —P(O)H— group.

By "phosphoric ester" is meant a —O—PO(OH)$_2$ group.

By "phosphoryl" is meant a —P(O)< group.

By "protecting group" is meant any group intended to protect a reactive group against undesirable synthetic reactions. Commonly used protecting groups are disclosed in "Greene's Protective Groups in Organic Synthesis," John Wiley & Sons, New York, 2007 (4th ed., eds. P. G. M. Wuts and T. W. Greene), which is incorporated herein by reference. O-protecting groups include an optionally substituted alkyl group (e.g., forming an ether with reactive group O), such as methyl, methoxymethyl, methylthiomethyl, benzoyloxymethyl, t-butoxymethyl, etc.; an optionally substituted alkanoyl group (e.g., forming an ester with the reactive group O), such as formyl, acetyl, chloroacetyl, fluoroacetyl (e.g., perfluoroacetyl), methoxyacetyl, pivaloyl, t-butylacetyl, phenoxyacetyl, etc.; an optionally substituted aryloyl group (e.g., forming an ester with the reactive group O), such as —C(O)—Ar, including benzoyl; an optionally substituted alkylsulfonyl group (e.g., forming an alkylsulfonate with reactive group O), such as —SO$_2$—R$^{S1}$, where R$^{S1}$ is optionally substituted C$_{1-12}$ alkyl, such as mesyl or benzylsulfonyl; an optionally substituted arylsulfonyl group (e.g., forming an arylsulfonate with reactive group O), such as —SO$_2$—R$^{S4}$, where R$^{S4}$ is optionally substituted C$_{4-18}$ aryl, such as tosyl or phenylsulfonyl; an optionally substituted alkoxycarbonyl or aryloxycarbonyl group (e.g., forming a carbonate with reactive group O), such as —C(O)—OR$^{T1}$, where R$^{T1}$ is optionally substituted C$_{1-12}$ alkyl or optionally substituted C$_{4-18}$ aryl, such as methoxycarbonyl, methoxymethylcarbonyl, t-butyloxycarbonyl (Boc), or benzyloxycarbonyl (Cbz); or an optionally substituted silyl group (e.g., forming a silyl ether with reactive group O), such as —Si—(R$^{T2}$)$_3$, where each R$^{T2}$ is, independently, optionally substituted C$_{1-12}$ alkyl or optionally substituted C$_{4-18}$ aryl, such as trimethylsilyl, t-butyldimethylsilyl, or t-butyldiphenylsilyl. N-protecting groups include, e.g., formyl, acetyl, benzoyl, pivaloyl, t-butylacetyl, alanyl, phenylsulfonyl, benzyl, Boc, and Cbz. Such protecting groups can employ any useful agent to cleave the protecting group, thereby restoring the reactivity of the unprotected reactive group.

By "salt" is meant an ionic form of a compound or structure (e.g., any formulas, compounds, or compositions described herein), which includes a cation or anion compound to form an electrically neutral compound or structure. Salts are well known in the art. For example, non-toxic salts are described in Berge S M et al., "Pharmaceutical salts," *J. Pharm. Sci.* 1977 January;66(1):1-19; and in "Handbook of Pharmaceutical Salts: Properties, Selection, and Use," Wiley-VCH, April 2011 (2nd rev. ed., eds. P. H. Stahl and C. G. Wermuth. The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine.

By "spirocyclyl" is meant an alkylene diradical, both ends of which are bonded to the same carbon atom of the parent group to form a spirocyclyl group and also a heteroalkylene diradical, both ends of which are bonded to the same atom.

By "sulfinyl" is meant an —S(O)— group.

By "sulfo" is meant an —S(O)$_2$OH group.

By "sulfone" is meant R'—S(O)$_2$—R'', where R' and R'' is an organic moiety. Exemplary groups for R' and R'' include, independently, optionally substituted alkyl, alkenyl, alkynyl, alkaryl, alkheterocyclyl, alkcycloalkyl, alkanoyl, alkoxy, alkoxyalkyl, alkoxycarbonyl, alkylsulfinyl, alkylsulfonyl, alkylsulfinylalkyl, alkylsulfonylalkyl, aminoalkyl, aryl, arylalkoxy, aryloxy, aryloxycarbonyl, aryloyl, arylsulfonyl, arylsulfonylalkyl, azidoalkyl, carboxyaldehyde, carboxyaldehydealkyl, carboxyl, cyano, cycloalkyl, cycloalkoxy, haloalkyl, heteroaryl, heterocyclyl, heterocyclyloxy, heterocyclyloyl, hydroxyalkyl, nitroalkyl, perfluoroalkyl, perfluoroalkoxy, spirocyclyl, thioalkaryl, thioalkheterocyclyl, or thioalkoxy, as defined herein. The sulfone can be unsubstituted or substituted. For example, the sulfone can be substituted with one or more substitution groups, as described herein for alkyl and/or aryl.

By "sulfonyl" is meant an —S(O)$_2$— group.

By "sultam" is meant an —S(O)$_2$—NR$^{L3}$— or an —NR$^{L3}$-S(O)$_2$— group, in which R$^{L3}$ is any useful moiety. Exemplary R$^{L3}$ groups include H, optionally substituted alkyl, optionally substituted haloalkyl, optionally substituted alkoxy, optionally substituted alkaryl, optionally substituted aryl, or halo.

By "thioalkaryl" is meant a thioalkoxy group, as defined herein, substituted with an aryl group, as defined herein.

By "thioalkheterocyclyl" is meant a thioalkoxy group, as defined herein, substituted with a heterocyclyl group, as defined herein.

By "thioalkoxy" is meant an alkyl group, as defined herein, attached to the parent molecular group through a sulfur atom. Exemplary unsubstituted thioalkoxy groups include C$_{1-6}$ thioalkoxy.

By "thioamido" is meant —C(S)NR$^{N1}$R$^{N2}$, where each of R$^{N1}$ and R$^{N2}$ is, independently, H or optionally substituted alkyl, or R$^{N1}$ and R$^{N2}$, taken together with the nitrogen atom to which each are attached, form a heterocyclyl group, as defined herein.

By "thio" is meant an —S— group

By "thiol" is meant an 'SH group.

By "attaching," "attachment," or related word forms is meant any covalent or non-covalent bonding interaction between two components. Non-covalent bonding interactions include, without limitation, hydrogen bonding, ionic interactions, halogen bonding, electrostatic interactions, π bond interactions, hydrophobic interactions, inclusion complexes, clathration, van der Waals interactions, and combinations thereof.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

BRIEF DESCRIPTION OF THE DRAWINGS

FIG. 4A-4E shows schematics of (A) a copolymer structure having formula (IIb); (B) non-limiting exemplary structures (IIb-1) and (IIb-2) having sulfonyl-based acidic moieties; (C) non-limiting exemplary structure (IIb-3) having sulfonyl-based electron-withdrawing moieties; (D) non-limiting exemplary structure (IIb-4) having sulfonyl-based acidic moieties and a linking segment that includes a reactive group; and (E) non-limiting exemplary structure (IIb-5) having sulfonyl-based acidic moieties and a linking segment that includes a reactive group.

FIG. 6A-6B shows schematics of (A) a polymer structure having formula (III') and (B) non-limiting exemplary structures (III'-1) and (III'-2).

DETAILED DESCRIPTION OF THE INVENTION

The present invention relates to polymer structures having various functional moieties. In particular embodiments, these functional moieties (e.g., acidic moieties) allow for proton conduction through pores formed by such polymer structures. In other embodiments, the functional moieties (e.g., any described herein) impart durability to the polymer by protecting the polyphenylene structure from oxidative damage. Structures for such polymers, as well as methods for making and using such polymers are described herein.

Polymer, Including Copolymers

The present invention encompasses polymers, including copolymers. Exemplary polymer include any described herein, such as non-limiting generic structure provided in formulas (I), (Ia), (Ib), (Ic), (Id), (II), (IIa), (IIb), (IIc), (IId), (III'), (III), (IV), (IVa), (V), and (Va), as well as particular structures provided as structures (Ib-1), (Ib-2), (Ic-1), (Id-1), (Id-2), (IIb-1), (IIb-2), (IIb-3), (IIb-4), (IIb-5), (IIc-1), (III'-1), (III'-2), (III-1), (III-2), and (IV-1), including salts thereof. Of these, formulas (II), (IIa), (IIb), (IIc), and (III) are considered to be copolymers. In particular embodiments, the copolymer of the invention includes at least one hydrophilic segment, at least one hydrophobic segment, and at least one linking segment connecting at least one hydrophilic segment with at least one hydrophobic segment.

Figure 1:
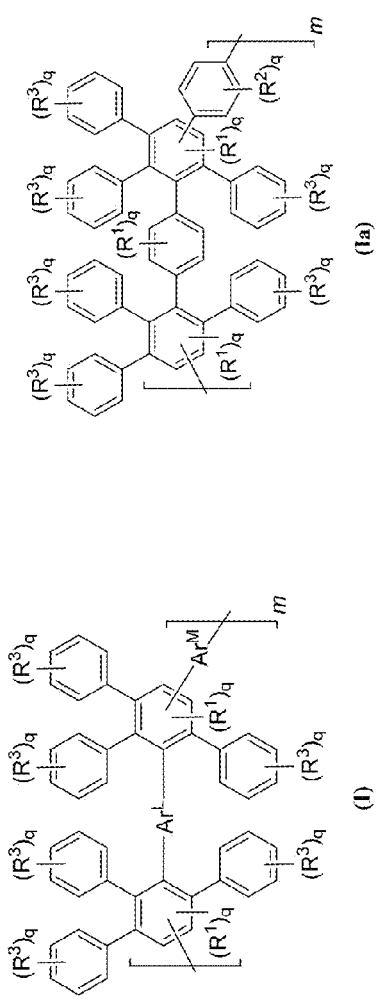
FIG. 1 shows schematics of polymer structures having formulas (I) and (Ia).

In one embodiment, a polymer includes the structure of formula (I), including salts thereof. As can be seen in FIG. 1, formula (I) is a generic structure encompassing other structures (e.g., formula (Ia)). The polymer can include any useful backbone structure. For instance, in formula (I), the backbone includes three groups, i.e., two $R^1$-substituted aryl groups and a bridging group $Ar^L$. The polymer can include any useful type of backbone substituents (e.g., backbone substituents $R^1$), as well as any useful number of such substituents on each group (e.g., q substituents, where q can be 1, 2, 3, 4, or 5). For any structure described herein, each $R^1$ is, independently, an acidic moiety (e.g., $R^S$, $R^P$, $R^C$, or any described herein), an electron-withdrawing moiety (e.g., $R^F$ or any described herein), or an inert substituent (e.g., H, halo, optionally substituted alkyl, optionally substituted alkoxy, etc.). In some embodiments, each and every $R^1$ is, independently, $R^S$, $R^P$, $R^C$, or $R^F$.

Each of bridging group $Ar^L$ and connecting group $Ar^M$ can be any useful bivalent linker. In particular embodiments, each of $Ar^L$ and $Ar^M$ is, independently, includes an optionally substituted arylene group. In some embodiments, each of $Ar^L$ and $Ar^M$ is, independently, an optionally substituted arylene group. In other embodiments, each of $Ar^L$ and $Ar^M$ is, independently, substituted with 1, 2, 3, or 4 $R^S$ substituent(s), $R^P$ substituent(s), $R^C$ substituent(s), $R^F$ substituent(s), or label(s). Exemplary labels include a detectable label, such as an NMR label (e.g., fluorine, such as $^{19}F$; nitrogen, e.g., $^{15}N$; or oxygen, e.g., $^{17}O$), a spin label, an isotopic label, a mass label, a fluorescent label, a dye, etc.

In yet other embodiments, each of $Ar^L$ and $Ar^M$ is, independently, configured to reduce meta linkages. Thus, in some instances, each of $Ar^L$ and $Ar^M$ is, independently, a bivalent linker formed by removing a hydrogen atom from opposite faces of an aryl group. Examples of such linkers include 1,4-benzenediyl (or 1,4-phenylene), 2,7-phenanthrylene (or 2,7-phenanthrenediyl), 1,5-naphthylene (or 1,5-napthalenediyl), etc. For example, the polymer can include a structure of Formula (Ia) having $Ar^L$ as a $R^1$-substituted 1,4-phenylene and $Ar^M$ as an $R^2$-substituted 1,4-phenylene.

The polymer can also include any useful type of pendent substituents (e.g., pendent substituents $R^3$), as well as any useful number of such substituents on each aryl group (e.g., q substituents, where q can be 1, 2, 3, 4, or 5). For any structure described herein, each $R^3$ is, independently, an acidic moiety (e.g., $R^S$, $R^P$, $R^C$, or any described herein), an electron-withdrawing moiety (e.g., $R^F$ or any described herein), or an inert substituent (e.g., H, halo, optionally substituted alkyl, optionally substituted alkoxy, etc.). In some embodiments, each and every $R^3$ is, independently, $R^S$, $R^P$, $R^C$, or $R^F$. In some embodiments, fully substituted pendent groups (e.g., $R^3$ is not H) can provide polymers with enhanced proton conduction and durability characteristics.

A polymer can include any useful number of structures of formula (I). In some embodiments, the polymer includes m structures, where m is an integer of from about 1 to 500.

Figure 2:
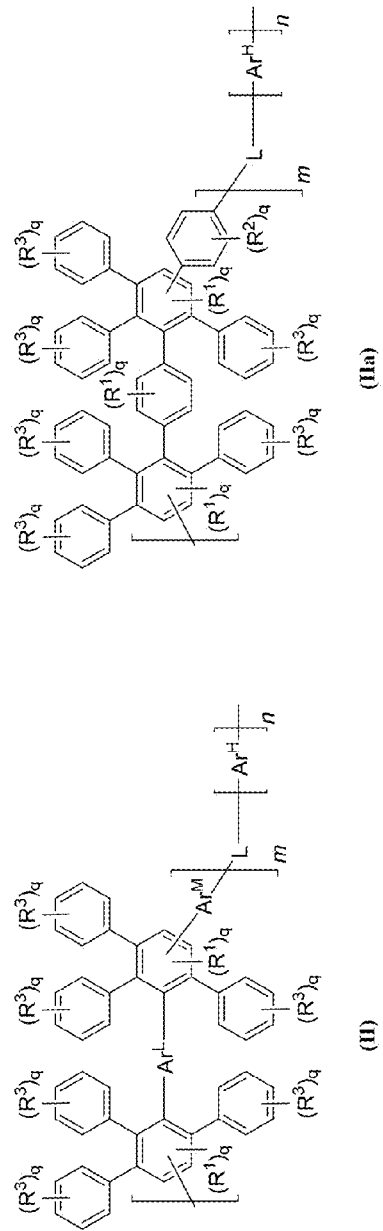
FIG. 2 shows schematics of copolymer structures having formulas (II) and (IIa).

The present invention also includes copolymers. In one embodiment, the copolymer includes the structure of formula (II), including salts thereof. As can be seen in FIG. 2, formula (II) is a generic structure encompassing other structures (e.g., formula (IIa)). Similar to formula (I) described above, the copolymer structure includes $R^1$-substituted aryl groups, bridging group $Ar^L$, connecting group $Ar^M$, pendent substituents $R^3$, and m units. Thus, the description for these substituents provided for formula (I) applies equally to formula (II). In some embodiments, each of $Ar^L$ and $Ar^H$ is, independently, an optionally substituted phenylene. In other embodiments, each of $Ar^L$ and $Ar^H$ is, independently, an optionally substituted 1,4-phenylene, as shown in formula (IIa) having $Ar^L$ as a $R^1$-substituted 1,4-phenylene and $Ar^M$ as an $R^2$-substituted 1,4-phenylene.

Formula (II) also includes additional groups, including a linking segment L and a hydrophobic segment $Ar^H$ of n units. The linking segment L can be any useful linkage to form a covalent bond between the two segments. Exemplary linking segments L include a covalent bond, an optionally substituted alkylene, an optionally substituted heteroalkylene, an optionally substituted alkyleneoxy, an optionally substituted heteroalkyleneoxy, an optionally substituted arylene, an optionally substituted aryleneoxy, an $Ar^H$ unit, or a structure of formula (I).

The copolymer can have any useful hydrophobic segment $Ar^H$. In some embodiments, $Ar^H$ includes a structure of formula (I) (e.g., where each $R^3$ is H, optionally substituted alkyl, or $R^F$; or where the number of $R^S$ substituents in $Ar^H$ is less than the number of $R^S$ and/or $R^P$ substituents in the hydrophilic segment); a sulfone subunit (e.g., a subunit including an $—SO_2—$ group); an arylene sulfone subunit (e.g., $—(Ar)_a—SO_2—(Ar)_b—$, where Ar is an optionally substituted arylene group, as defined herein, and each a and b is an integer of about 0 to 10 and at least one of a or b is 1 or more); an ether sulfone subunit (e.g., $—(X^1)_a—SO_2—(X^2)_b—O—$ or $—X^1—O—X^2—SO_2—$, where each $X^1$ and $X^2$ is, independently, any useful group, such as optionally substituted arylene or optionally substituted alkylene, and each a and b is an integer of about 0 to 10 and at least one of a or b is 1 or more); an arylene ether subunit (e.g., $—(Ar)_a—O—(Ar)_b—$, where Ar is an optionally substituted arylene group, as defined herein, and each a and b is an integer of about 0 to 10 and at least one of a or b is 1 or more); an arylene ketone subunit (e.g., $—(Ar)_a—C(O)—(Ar)_b—$, where Ar is an optionally substituted arylene group, as defined herein, and each a and b is an integer of about 0 to 10 and at least one of a or b is 1 or more); a perfluoroalkyl subunit (e.g., $—(CF_2)_{f1}—$, where f1 is an integer of 1 to about 16); or a perfluoroalkoxy subunit (e.g., $—O(CF_2)_{f1}—$, $—(CF_2)_{f1}O—$, $—O(CF_2)_{f1}CF(CF_2)_{f2}—$, or $>CFO(CF_2)_{f1}CF(CF_2)_{f2}—$, where each f1 and f2 is, independently, an integer of 1 to about 16).

In some embodiments, formula (II) includes a hydrophobic segment $Ar^H$ and a hydrophilic segment. In other embodiments, the hydrophilic segment includes the two $R^1$-substituted aryl groups and a bridging group $Ar^L$. Thus, in some embodiments, at least one substituent in this hydrophilic segment (e.g., substituents $R^1$, $R^2$, or $R^3$) is a hydrophilic moiety (e.g., an acidic moiety, such as any $R^S$, $R^P$, and/or $R^C$ described herein or any moiety including a sulfonyl group or a phosphoryl group).

A copolymer can include any useful number or ratio of hydrophilic and hydrophobic segments. In some embodiments, formulas (II) and (IIa) include m number of hydrophilic segments and n number of hydrophobic segments, where each of m and n is, independently, an integer of from about 1 to 500. In other embodiments, the m (the number of hydrophilic segments) is minimized in order to minimize swelling of the copolymer. For example, in some instances, m<n. In other instance, n is at least about 5 times greater than m (e.g., n is about 10 times greater than m, or n is about 20 times greater than m). In yet other instances, m is of from about 1 to 100, and n is of from about 5 to 500 (e.g., m is of from about 1 to 50, and n is of from about 5 to 500; m is of from about 1 to 50, and n is of from about 10 to 100; m is of from about 1 to 10, and n is of from about 5 to 500; m is of from about 1 to 20, and n is of from about 20 to 400; and m is of from about 1 to 10, and n is of from about 100 to 200).

Figure 3A:
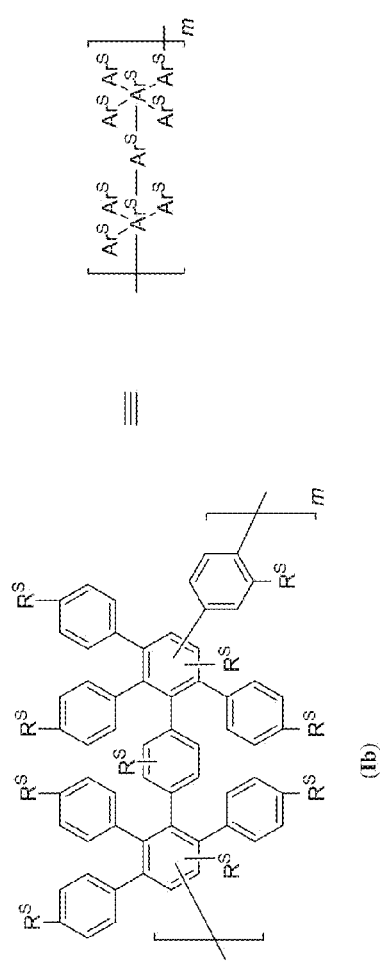
FIG. 3A-3B shows schematics of (A) a polymer structure having formula (Ib) and (B) non-limiting exemplary structures (Ib-1) and (Ib-2).
Figure 3B:
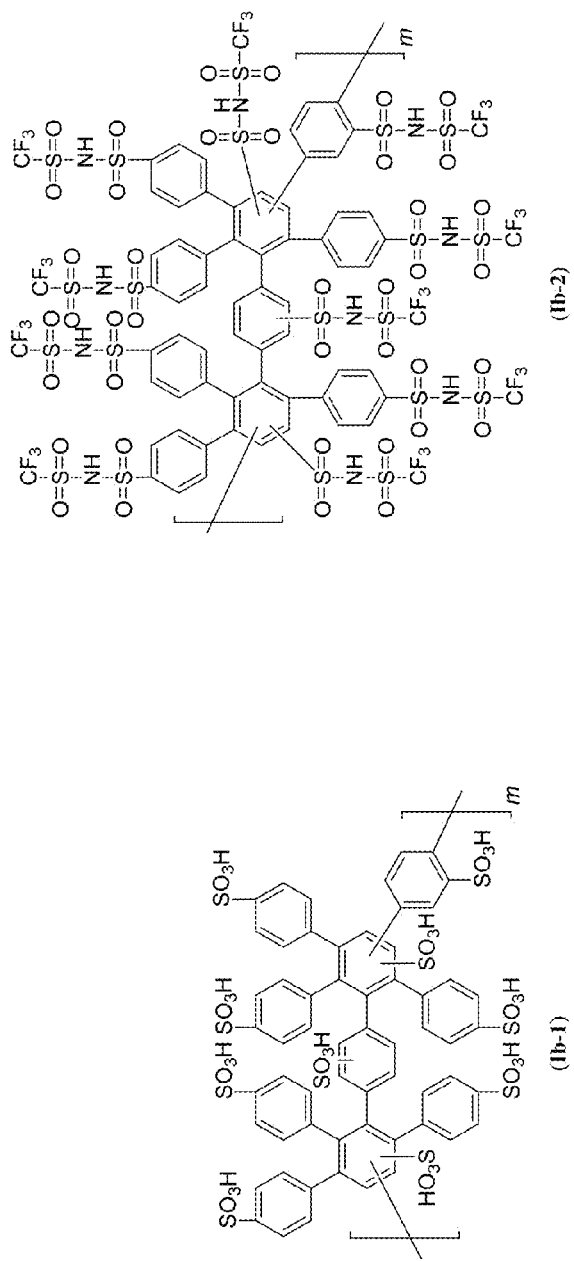

For any polymer herein, including any copolymer herein, each and every $R^1$ can be independently, $R^S$, $R^P$, $R^C$, and/or $R^F$. For instance, in some embodiments, each aryl group in the polymer or a segment thereof is substituted with an $R^S$, an $R^P$, and/or an $R^C$ substitution, where each substitution may be the same or different. An exemplary structure is provided as structure (Ib) in FIG. 3A, where each aryl group is substituted with an $R^S$, and such substituted aryl groups are denoted as $Ar^S$. Particular examples of polymers having substituted $Ar^S$ include structures (Ib-1) and (Ib-2) having acidic moieties including sulfonyl groups (FIG. 3B).

Figure 4C:
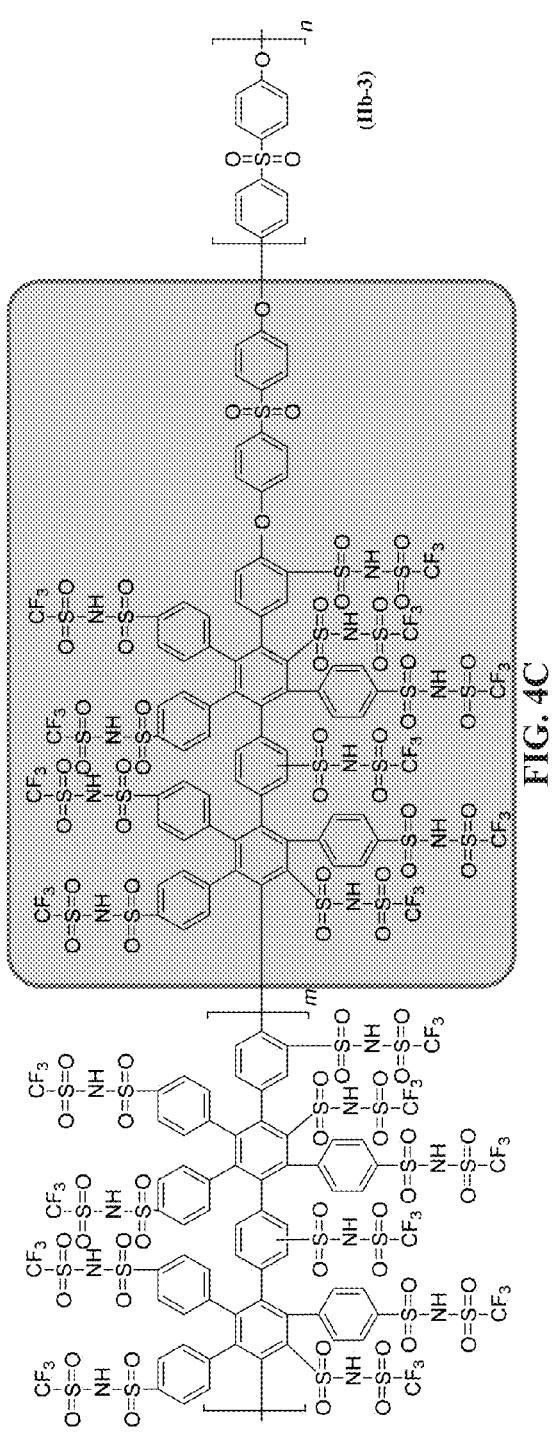

In other embodiments, the hydrophilic segment of the copolymer is composed of a structure in which each aryl group is substituted with an $R^S$, an $R^P$, and/or an $R^C$ substitution, where each substitution may be the same or different. An exemplary structure is provided as structure (IIb) in FIG. 4A, where each aryl group in the hydrophilic segment is substituted with an $R^S$, and such substituted aryl groups are denoted as $Ar^S$. Particular examples of copolymers having substituted $Ar^S$ in the hydrophilic segment include structures (IIb-1), (IIb-2), and (IIb-3) having acidic moieties including sulfonyl groups (FIG. 4B-4D).

As can be seen, the copolymers include a linking segment L, as indicated by a gray rectangle in FIG. 4A-4D. The linking segment can be any useful linkage (e.g., any herein), including those composed of structures, or a portion of such structures, in the hydrophilic segment and/or the hydrophobic segment. For instance, as seen in structure (IIb-2) in FIG. 4B, the linking segment L is composed of two substructures: (i) a substituted polyphenylene structure of the hydrophilic segment and (ii) an arylene sulfone structure of the hydrophobic segment.

Figure 4D:
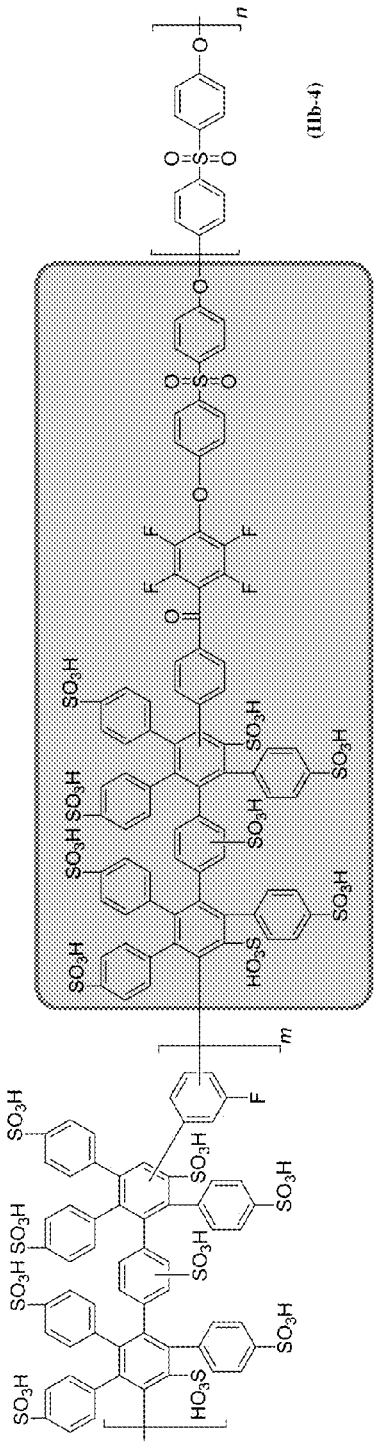
Figure 4E:
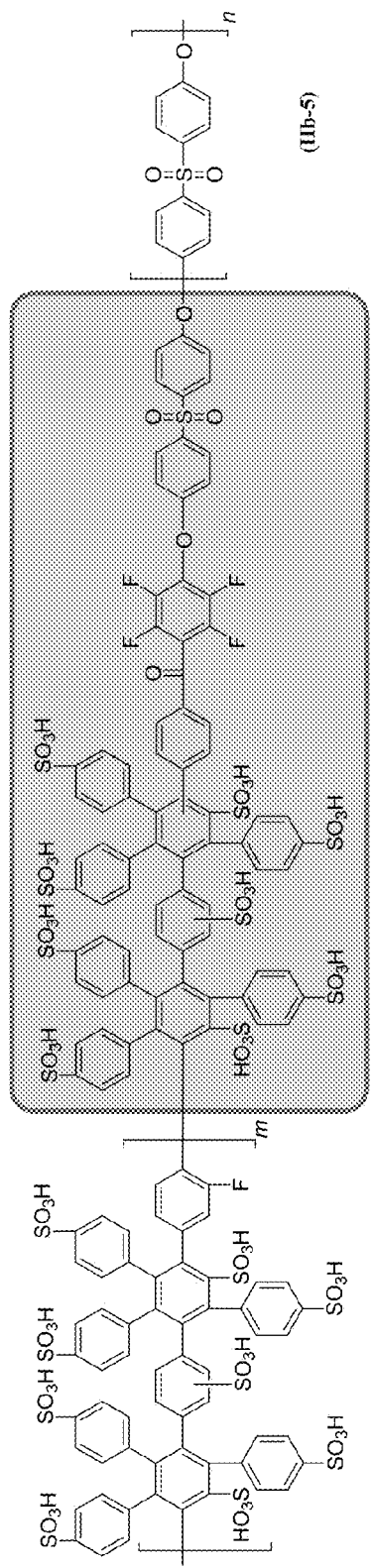

In another instance, as seen in structure (IIb-4) in FIG. 4D, the linking segment L is composed of three substructures: (i) a substituted polyphenylene structure of the hydrophilic segment; (ii) a reactive group, which includes an optionally substituted arylene ketone (i.e., —Ph—C(O)—Ph, in which Ph is an optionally substituted phenylene group) and (ii) an arylene sulfone structure of the hydrophobic segment. A particular example of such a polymer is structure (IIb-5) in FIG. 4E, in which m is greater than n. In some instances, m can be about 5.6 and n can be about 60.7 or 121.4. In other instances, m is of from about 1 to 20, and n is of from about 20 to 400.

Figure 5A:
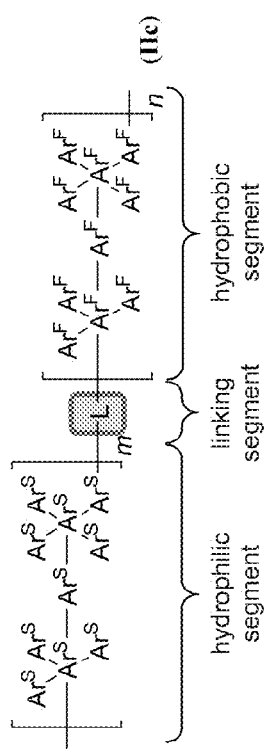
FIG. 5A-5B shows schematics of (A) a copolymer structure having formula (IIc) and (B) non-limiting exemplary structure (IIc-1) having sulfonyl-based acidic moieties and aryloyl-based hydrophobic moieties.
Figure 5B:
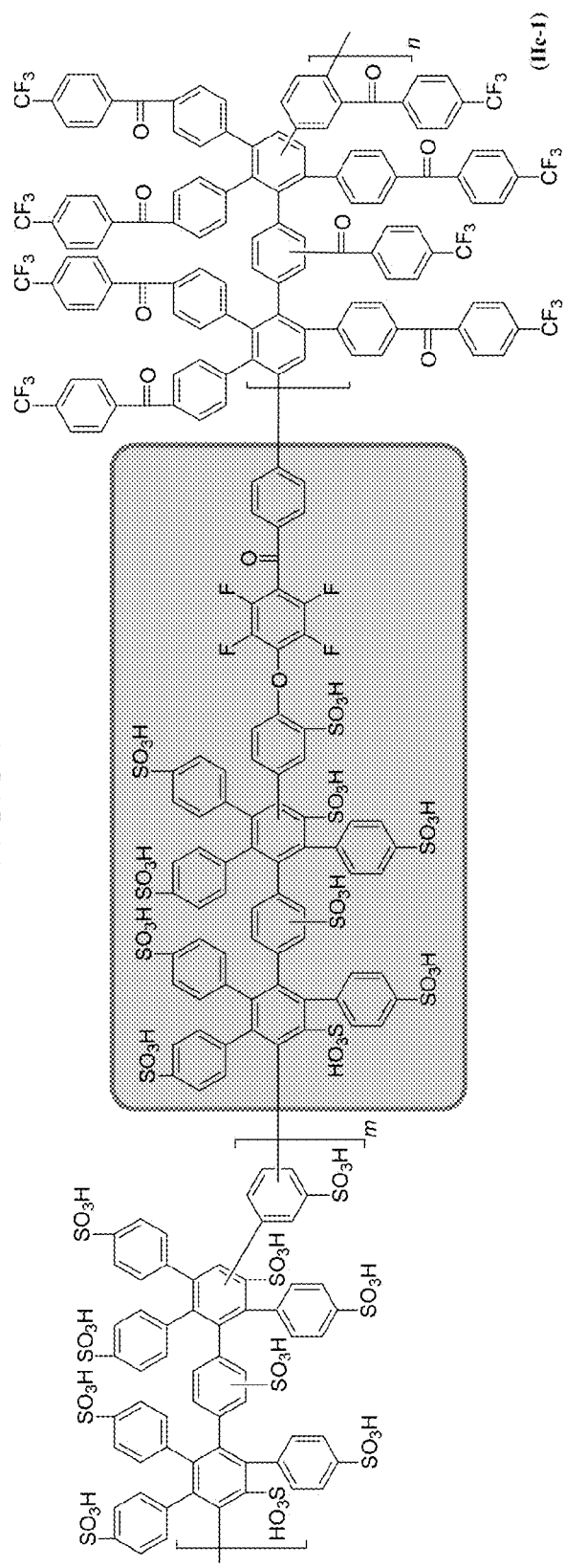

In particular embodiments, the copolymer is composed of a hydrophilic segment including $Ar^S$ and a hydrophobic segment including $Ar^F$ (i.e., aryl groups substituted with $R^F$ substitutions, where each $R^F$ can be the same or different). An exemplary structure is provided as structure (IIc) in FIG. 5A, where each aryl group in the hydrophilic segment is substituted with an $R^S$ (denoted as $Ar^S$), and each aryl group in the hydrophobic segment is substituted with an $R^F$ (denoted as $Ar^F$). Particular examples of copolymers having substituted $Ar^S$ and $Ar^F$ include structure (IIc-1) (FIG. 5B).

Figure 7A:
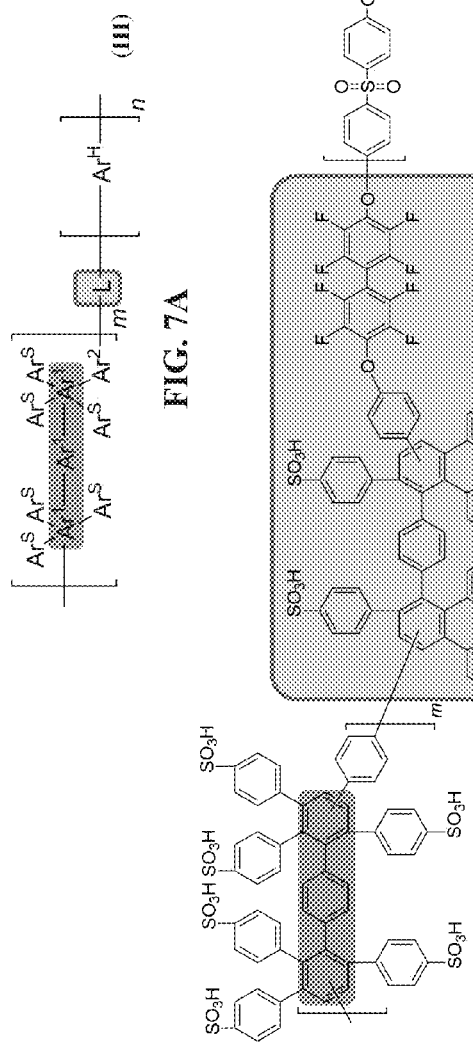
FIG. 7A-7B shows schematics of (A) a copolymer structure having formula (III) and (B) non-limiting exemplary structures (III-1) and (III-2) having differing hydrophobic segment $Ar^H$.
Figure 7B:
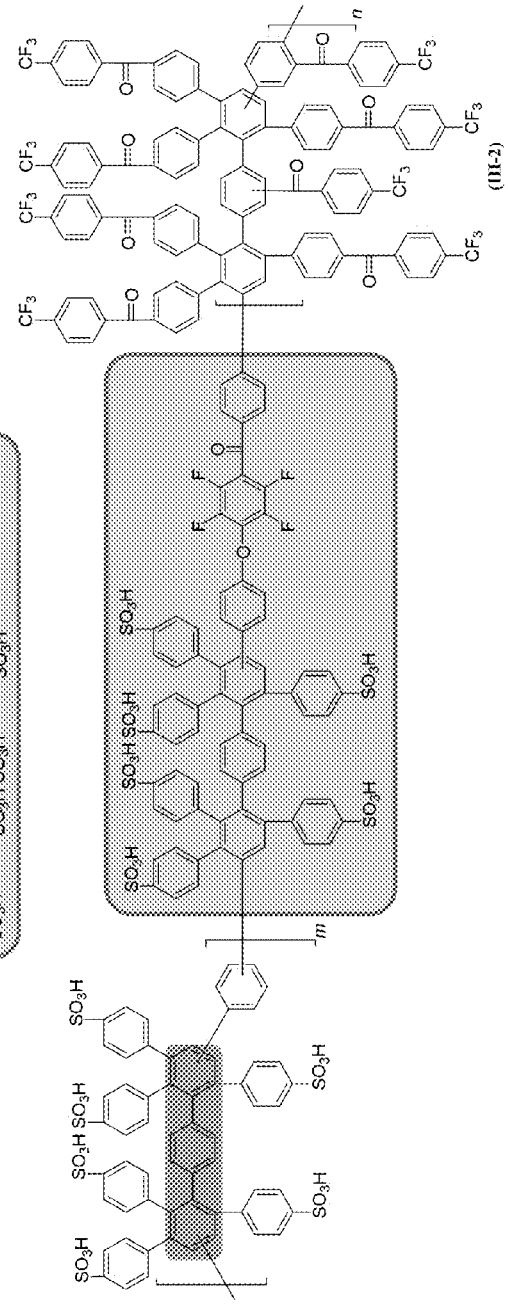

In some embodiments, the copolymer includes a hydrophilic segment having acidic moieties (e.g., $R^S$, $R^P$, and/or $R^C$, as well as combinations thereof) on only the pendent aryl groups. Exemplary hydrophilic segments include those having $R^S$-substituted pendent aryl groups (denoted as $Ar^S$), $R^P$-substituted pendent aryl groups, and $R^1$-substituted backbone aryl groups (denoted at $Ar^1$), such as those, e.g., encompassed by formula (III') in FIG. 6A. Particular examples of segments having $Ar^S$ pendent groups and $Ar^1$ backbone groups include structures (III'-1) and (III'-2) (FIG. 6B). Exemplary copolymers with such hydrophilic segments are provided as formula (III) in FIG. 7A, and particular examples of copolymers include structures (III-1) and (III-2) (FIG. 7B).

Figure 8A:
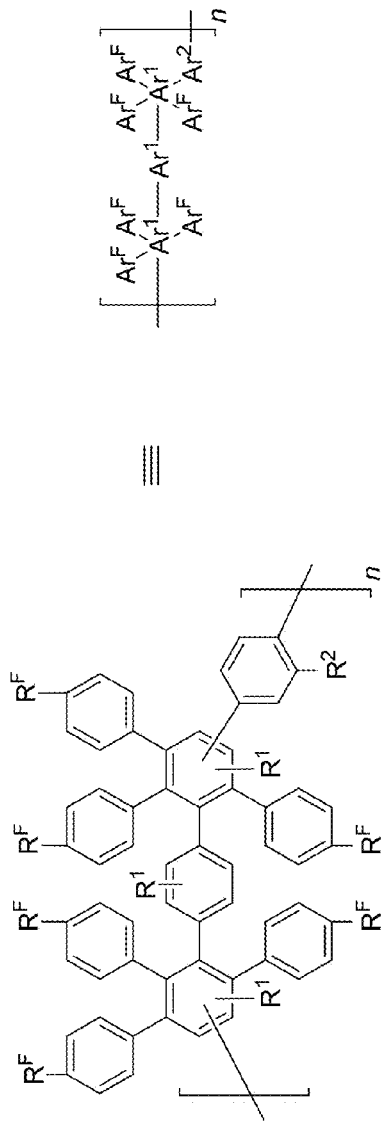
FIG. 8A-8C shows (A) a polymer structure having formula (Ic); (B) an exemplary reaction scheme to form structure (Ic-1) having electron-withdrawing moieties; and (C) an NMR spectrum of structure (Ic-1).
Figure 8B:
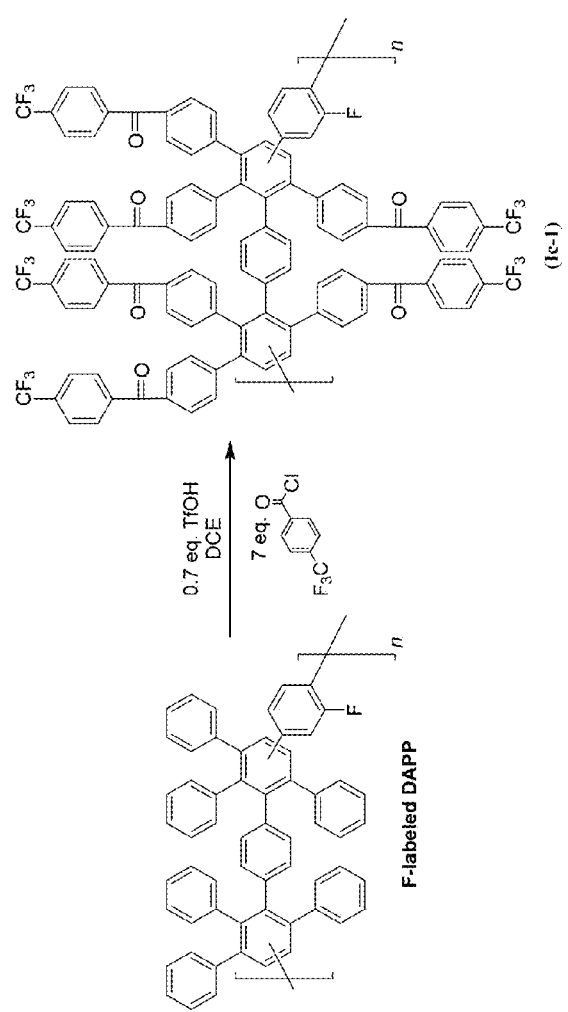

The present invention also includes polymers (e.g., copolymers) having a hydrophobic segment having one or more electron-withdrawing moieties (e.g., $R^F$). In particular, the use of such electron-withdrawing moieties could reduce potential oxidation sites by oxidizing species, pollutants, or contaminants (e.g., metal ions, such as $V^{+5}$ ions). In some embodiments, each pendent aryl group in the polymer or a segment thereof is substituted with an $R^F$ substitution, where each substitution may be the same or different. An exemplary structure is provided as structure (Ic) in FIG. 8A, where each pendent aryl group is substituted with an $R^F$, and such substituted aryl groups are denoted as $Ar^F$. Particular examples of polymers having substituted $Ar^F$ include structures (Ic-1) and (Ib-2) having electron-withdrawing moiety of a perfluoroalkyl-substituted benzoyl (FIG. 8B). In other embodiments, both pendent and backbone aryl groups are each, independently, an $Ar^F$.

Figure 9A:
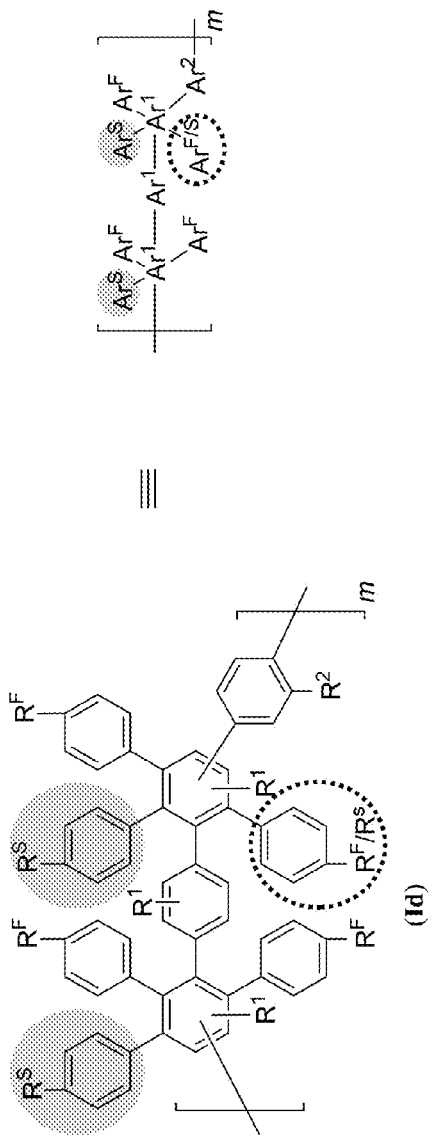
FIG. 9A-9D shows schematics of (A) a polymer structure having formula (Id) including both $R^F$ and $R^S$; (B) non-limiting exemplary structures (Id-1) and (Id-2); (C) an exemplary reaction scheme to form structure (Id-2); and (D) photographs of a polymer having structure (Id-2) (labeled "OSG") in the presence of oxidizing agent concentrated $VO_2^+$, where controls are provided for a blank vial and for a vial containing a polymer having structure (III'-2) (labeled "SDAPP").
Figure 9B:
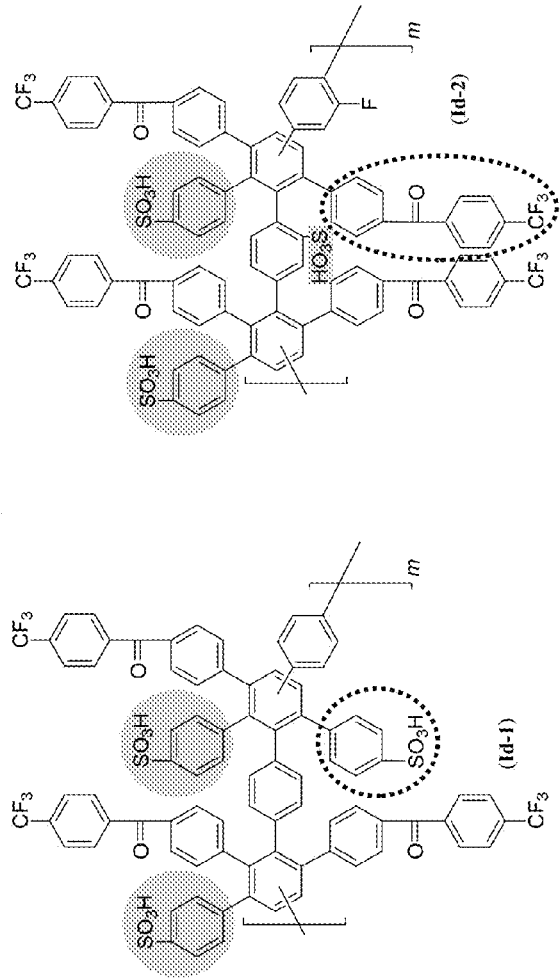

Both acidic substitutions (e.g., $R^S$, $R^P$, and/or $R^C$, as well as combinations thereof) and $R^F$ substitutions can be present on the same polymer or on the same segment of the polymer. In particular, the use of acidic moieties and electron-withdrawing moieties could provide orthogonal chemistries to control and optimize performance (e.g., by employing acidic moieties to control ion conduction) and durability (e.g., by employing electron-withdrawing moieties to reduce oxidation). An exemplary structure is provided as structure (Id) in FIG. 9A, where each pendent aryl group is substituted with an $R^F$, an $R^S$, an $R^P$, and/or an $R^C$. Optionally, one or more backbone aryl groups can be further substituted with an $R^F$, an $R^S$, an $R^P$, and/or an $R^C$. Particular examples of polymers having substituted $Ar^S$ and $Ar^F$ groups include structures (Id-1) and (Id-2) having acidic sulfonic acid moieties and electron-withdrawing perfluoroalkyl-substituted benzoyl moieties (FIG. 9B).

Polymer Reagents

The present invention also includes reagents having any useful polymer segment (e.g., hydrophilic segment or hydrophobic segment) described herein. For instance, the reagent can include a polymer segment disposed between two reactive end groups, where each end group can be the same or different. The polymer segment can be any described herein (e.g., a structure provided in formulas (I), (Ia), (Ib), (Ic), (Id), (II), (IIa), (IIb), (IIc), (IId), (III'), and (III), as well as particular structures provided as structures (Ib-1), (Ib-2), (Ic-1), (Id-1), (Id-2), (IIb-1), (IIb-2), (IIb-3), (IIb-4), (IIb-5), (IIc-1), (III'-1), (III'-2), (III-1), and (III-2)). In addition, the polymer segment can include a hydrophobic segment (e.g., $Ar^H$), such as any described herein.

Optionally, a sublink L' can be present between the polymer segment and a reactive end group. The sublink L' can be composed of any useful linkage, such as any described herein (e.g., those described for linking segment L).

The reactive end group can be any useful group configured to react with a second reactive end group. In this way, ordered copolymer block structures can be synthesized by selectively placing reactive end groups on the ends of blocks or segments to form polymer reagents, and then reacting that polymer reagents to place the segments in an end-to-end fashion in the copolymer. A skilled artisan would understand how to place reactive end groups in a polymer reagent in order to form a copolymer with the desired configuration or order.

The reactive end group is usually placed on the ends of a first polymer reagent, as well as on the ends of the second polymer reagent. Then, a first reactive end group on the first polymer reagent reacts with the second reactive end group on the second polymer reagent. The first and second reactive end groups can be chosen from a pair of co-reactive groups. For example, such pairs of co-reactive groups include (i) a nucleophile for use with (ii) an electrophile; (i) an optionally substituted aryl group (e.g., having a —C(O)R$^1$ group, where R$^1$ is an aryl group having one or more halo) for use with (ii) an optionally substituted aryl group (e.g., having a —OR$^{Pr}$ group, where R$^{Pr}$ is H or an O-protecting group that can be deprotected prior to conducting a reaction); (i) an optionally substituted aryl group (e.g., having a —C(O)R$^1$ group, where R$^1$ is an aryl group having one or more halo) for use with (ii) an optionally substituted alkoxy group (e.g., such as —OR$^{Pr}$, where R$^{Pr}$ is H or an O-protecting group that can be deprotected prior to conducting a reaction); (i) an optionally substituted aryl group for use with (ii) an optionally substituted alkoxy group (e.g., such as —OR$^{Pr}$, where R$^{Pr}$ is H or an O-protecting group that can be deprotected prior to conducting a reaction); (i) an optionally substituted alkynyl group for use with (ii) an optionally substituted azido group, which can participate in a Huisgen 1, 3-dipolar cycloaddition reaction; as well as (i) an optionally substituted diene having a 4π electron system for use with (ii) an optionally substituted dienophile or an optionally substituted heterodienophile having a 2π electron system, which can participate in a Diels-Alder reaction. For the co-reactive groups above, reagent (i) reacts with reagent (ii) in each pair.

Figure 10A:
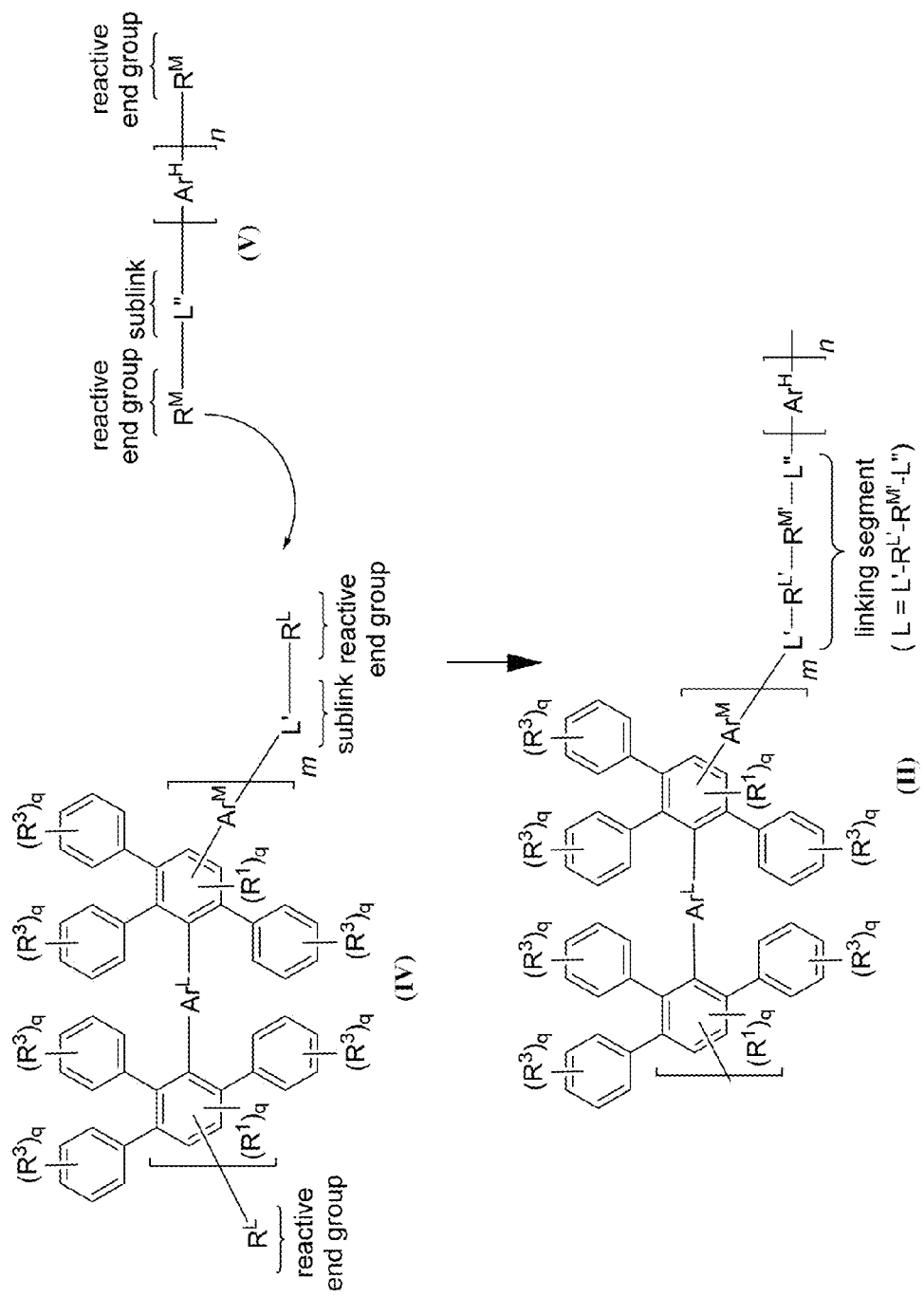
FIG. 10A-10C shows schematics of (A) an exemplary reaction scheme between a compound having structure (IV) with a second reagent having structure (V), thereby forming a copolymer structure having formula (II). Also provided are (B) an exemplary reaction scheme between a compound having structure (IVa) with a second reagent having structure (Va), thereby forming a copolymer structure having formula (IId) and (C) a non-limiting exemplary structure (IV-1).

Exemplary polymer reagents are provided as structures (IV) and (V) in FIG. 10A. As can be seen, polymer reagent (IV) includes a two reactive end groups R$^L$ with a polymer segment (in brackets) placed between the reactive end groups. For this exemplary reagent, the optional sublink is located between the polymer segment and one of the reactive end groups. For reagent (IV), the polymer segment is that of formula (I), but any formula or structure herein can be employed for this polymer segment.

Figure 10B:
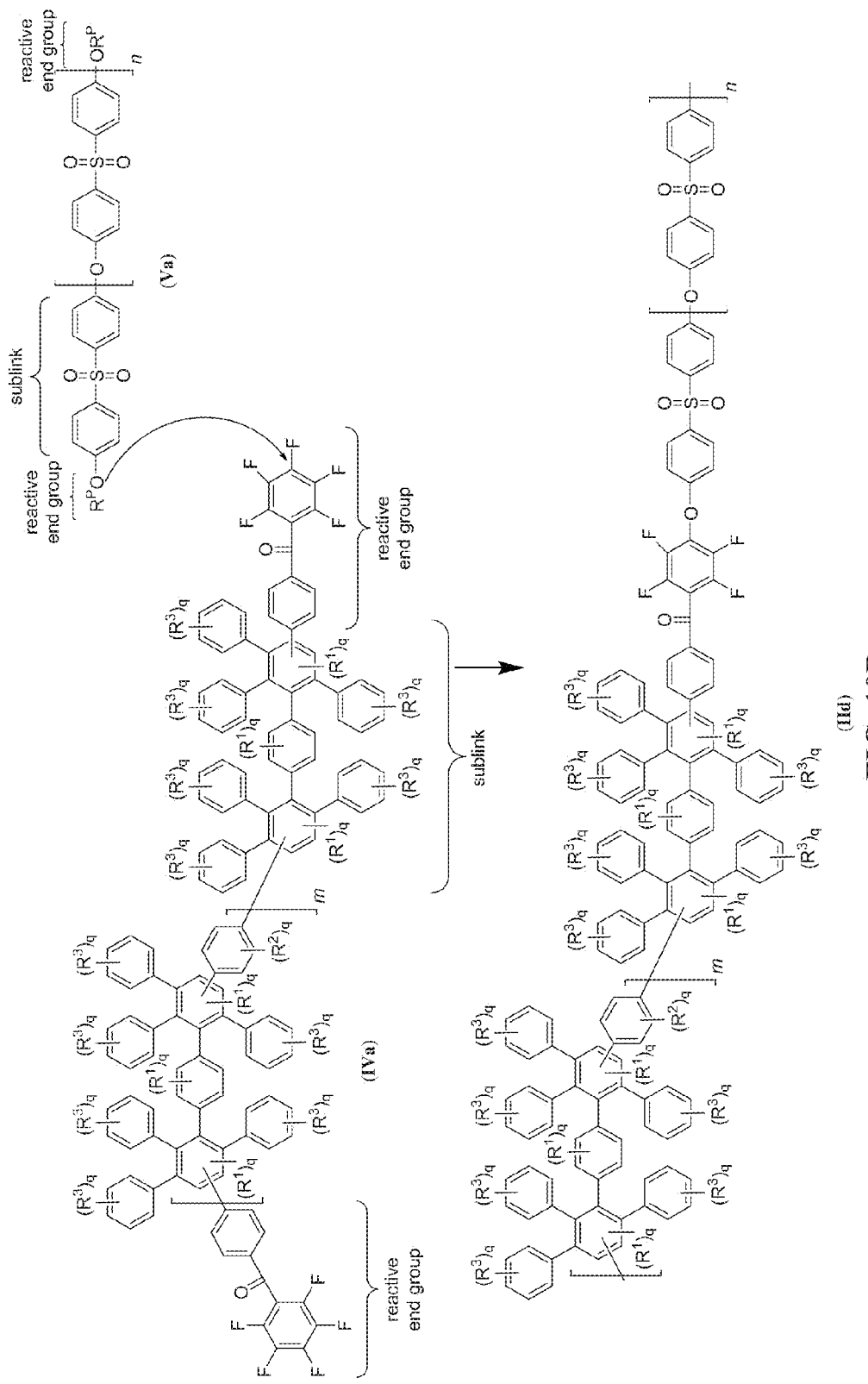

The second polymer reagent (V) includes two reactive end groups R$^M$ with a polymer segment [Ar$^H$]$_n$ placed between the reactive end group. The sublink L" is optional and can be any useful linkage (e.g., those described for linking segment L). If present, sublinks L' and L" may be the same or different. As shown in FIG. 10B, reagent (IVa) includes a sublink having a structure similar to that of Formula (I) but lacking aryl group Ar$^M$. Reagent (Va) includes a sublink having an arylene sulfone subunit. Any useful polymer segment, or portion thereof, may be employed in the sublink regions.

Figure 10C:
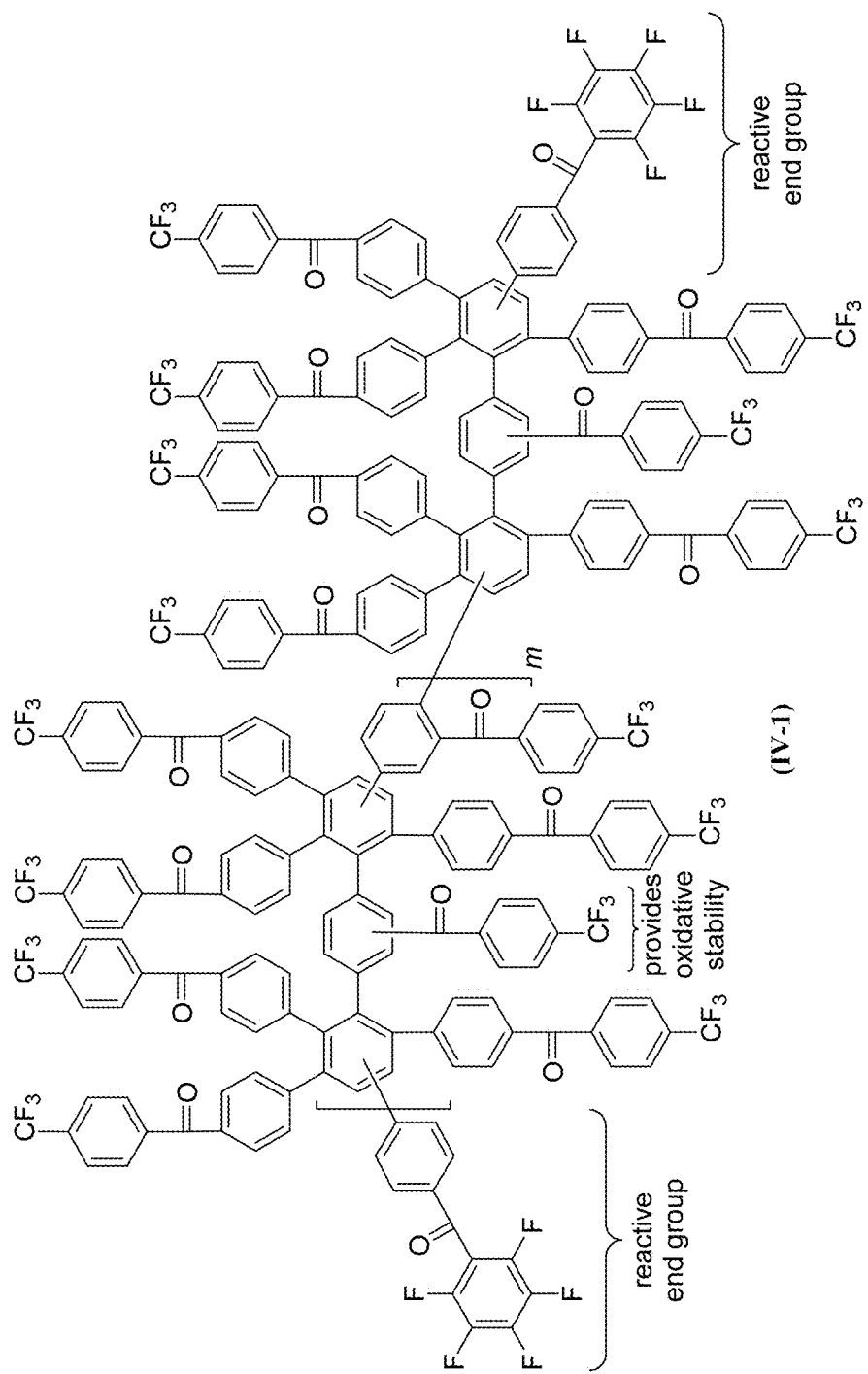

In some embodiments, R$^L$ and R$^M$ are chosen from a pair of co-reactive groups, such as any herein. In this manner, polymer reagent (IV) is attached to polymer reagent (V) in a controlled manner to form copolymer having formula (II) (see FIG. 10A). After the reaction, one or more protons may be transferred, removed, or added, where R$^{L'}$ indicates reactive group R$^L$ after the reaction and R$^{M'}$ indicates reactive group R$^M$ after the reaction. As shown in FIG. 10B, the reactive end group in reagent (IVa) is an aryl group having a —C(O)R$^1$ group, where R$^1$ is an perfluoroaryl group, and the reactive end group in reagent (Va) is an optionally substituted aryl group —OR$^{Pr}$, where R$^{Pr}$ is H or an O-protecting group that can be deprotected prior to conducting the reaction. After the reaction, the polymer segments of reagents (IVa) and (Va) are attached by way of a linking segment to form copolymer (IId). FIG. 10C provides a particular reagent (IV-1), which is a specific example encompassed by formula (IV). Reagent (IV-1) includes electron-withdrawing moieties on the pendent and backbone aryl groups. A skilled artisan would understand that these reagents and synthetic methodologies can be modified to install the desired chemical functionality and to form the desired polymer function and structure.

Functional Moieties

The present invention includes the use of functional moieties, such as acidic moieties and electron-withdrawing moieties. Exemplary acidic moieties (e.g., R$^S$) include any group having one or more sulfonyl groups, such as sulfo (e.g., —SO$_2$—OH), alkylsulfonyl (e.g., —SO$_2$—R$^{S1}$, where R$^{S1}$ is optionally substituted C$_{1-12}$ alkyl), alkylsulfonylalkyl (e.g., —R$^{SA}$—SO$_2$R$^{S1}$, where each of R$^{SA}$ is optionally substituted C$_{1-12}$ alkylene or optionally substituted heteroalkylene and R$^{S1}$ is optionally substituted C$_{1-12}$ alkyl), arylsulfonyl (e.g., —SO$_2$—R$^{Ar}$, where R$^{Ar}$ is optionally substituted C$_{4-18}$ aryl), arylsulfonylalkyl (e.g., —R$^{SA}$—SO$_2$—R$^{Ar}$, where R$^{SA}$ is independently, optionally substituted C$_{1-12}$ alkyl or alkylene and R$^{Ar}$ is optionally substituted C$_{4-18}$ aryl), sulfonamoyl (e.g., —SO$_2$NR$^{N1}$R$^{N2}$), sulfoamino (e.g., —N(R$^{N1}$)—SO$_2$—R$^{S3}$), aminosulfonyl (e.g., —SO$_2$—NR$^{N1}$—R$^{S2}$), or sulfonyl imide (e.g., —SO$_2$—NR$^{N1}$—SO$_2$—R$^{S3}$), where each of R$^{N1}$ and R$^{N2}$ is, independently, H, optionally substituted C$_{1-12}$ alkyl (e.g., haloalkyl, such as perfluoroalkyl), optionally substituted C$_{4-18}$ aryl, or optionally substituted C$_{1-12}$ alk-C$_{4-18}$ aryl; R$^{S2}$ is H, optionally substituted C$_{1-12}$ alkyl (e.g., haloalkyl, such as perfluoroalkyl), hydroxyl, optionally substituted C$_{1-12}$ alkylsulfonyl, optionally substituted C$_{4-18}$ aryl, or optionally substituted C$_{1-12}$ alk-C$_{4-18}$ aryl; and R$^{S3}$ is H, hydroxyl, optionally substituted C$_{1-12}$ alkyl (e.g., haloalkyl, such as perfluoroalkyl), optionally substituted C$_{4-18}$ aryl, or optionally substituted C$_{1-12}$ alk-C$_{4-18}$ aryl.

In any of these moieties, each R$^{S1}$ and R$^{S3}$ is, independently, optionally substituted C$_{1-12}$ alkyl (e.g., haloalkyl, such as C$_{1-12}$ perfluoroalkyl), optionally substituted C$_{1-12}$ alkoxy, optionally substituted C$_{4-18}$ aryl, optionally substituted C$_{1-12}$ alk-C$_{4-18}$ aryl optionally substituted C$_{4-18}$ aryloxy, hydroxyl, or H; each R$^{S2}$ is independently, optionally substituted C$_{1-12}$ alkyl (e.g., haloalkyl, such as perfluoroalkyl), optionally substituted C$_{1-12}$ alkylsulfonyl, optionally substituted C$_{1-12}$ alkoxy, optionally substituted C$_{4-18}$ aryl, optionally substituted C$_{1-12}$ alk-C$_{4-18}$ aryl optionally substituted C$_{4-18}$ aryloxy, hydroxyl, or H; each R$^{Ar}$ is, independently, optionally substituted C$_{4-18}$ aryl, optionally substituted C$_{1-12}$ alk-C$_{4-18}$ aryl, or optionally substituted C$_{4-18}$ aryloxy; each of R$^{SA}$ is, independently, oxy, optionally substituted C$_{1-12}$ alkylene, or optionally substituted heteroalkylene; and each of R$^{N1}$ and R$^{N2}$ is, independently, H, optionally substituted C$_{1-12}$ alkyl (e.g., haloalkyl, such as perfluoroalkyl), optionally substituted C$_{4-18}$ aryl, or optionally substituted C$_{1-12}$ alk-C$_{4-18}$ aryl.

Other exemplary acidic moieties (e.g., R$^F$) include any group having one or more phosphoryl groups, such as phosphono (e.g., —P(O)(OH)$_2$), phosphoric ester (e.g., —O-PO(OH)$_2$ or —O-P(O)<R$^{P1}$R$^{P2}$ or —O-P(O)<R$^{Ar}$R$^{P2}$ or —O-P(O)<R$^{Ar}$R$^{Ar}$, where each R$^{Ar}$ is the same or different), alkylphosphoryl (e.g., —P(O)<R$^{P1}$R$^{P2}$, where R$^{P1}$ is optionally substituted C$_{1-12}$ alkyl or optionally substituted C$_{1-12}$ alkoxy; and R$^{P2}$ is optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), substituted phosphonoyl (e.g., —P(O)HR$^{P1}$, where R$^{P1}$ is optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), alkylphosphorylalkyl (e.g., —R$^{PA}$-P(O)<R$^{P1}$R$^{P2}$, where R$^{PA}$ is optionally substituted C$_{1-12}$ alkylene or optionally substituted heteroalkylene; and each of R$^{P1}$ and R$^{P2}$ is, independently, optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), arylphosphoryl (e.g., —P(O)<R$^{Ar}$R$^{P2}$ or —P(O)<R$^{Ar}$R$^{Ar}$, where each R$^{Ar}$ is, independently, optionally substituted C$_{4-18}$ is aryl, optionally substituted C$_{1-12}$ alk-C$_{4-18}$ aryl, or optionally substituted C$_{4-18}$ aryloxy; and R$^{P2}$ is optionally substituted C$_{1-12}$ alkyl, optionally substituted C$_{1-12}$ alkoxy, optionally substituted C$_{4-18}$ aryl, optionally substituted C$_{1-12}$ alk-C$_{4-18}$ aryl, optionally substituted C$_{4-18}$ aryloxy, hydroxyl, or H), or arylphosphorylalkyl (e.g., —R$^{PA}$—P(O)<R$^{Ar}$R$^{P2}$ or —R$^{PA}$-P(O)<R$^{Ar}$R$^{Ar}$, where R$^{PA}$ is, independently, optionally substituted C$_{1-12}$ alkylene or optionally substituted heteroalkylene; each $R^{Ar}$ is, independently, optionally substituted $C_{4-18}$ aryl, optionally substituted $C_{1-12}$ alk-$C_{4-18}$ aryl, or optionally substituted $C_{4-18}$ aryloxy; and $R^{P2}$ is optionally substituted $C_{1-12}$ alkyl, optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H), where each of these groups can be optionally substituted (e.g., with one or more substituents described for alkyl, as defined herein).

In any of these moieties, each of $R^{P1}$ and $R^{P2}$ is, independently, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H; each of $R^{Ar}$ is, independently, optionally substituted $C_{4-18}$ aryl, optionally substituted $C_{1-12}$ alk-$C_{4-18}$ aryl, or optionally substituted $C_{4-18}$ aryloxy; and each $R^{PA}$ is, independently, oxy, optionally substituted $C_{1-12}$ alkylene, or optionally substituted heteroalkylene.

Yet other exemplary acidic moieties (e.g., $R^C$) include any group having a carbonyl group, such as carboxyl (e.g., —$CO_2H$), —C(O)—$R^{C1}$, or —$R^{CA}$—C(O)—$R^{C1}$ (e.g., where each $R^{C1}$ is, independently, optionally substituted $C_{1-12}$ alkyl (e.g., haloalkyl, such as $C_{1-12}$ perfluoroalkyl), optionally substituted $C_{1-12}$ alkoxy, optionally substituted $C_{4-18}$ aryl, optionally substituted $C_{1-12}$ alk-$C_{4-18}$ aryl, optionally substituted $C_{4-18}$ aryloxy, hydroxyl, or H; and each $R^{CA}$ is, independently, oxy, optionally substituted $C_{1-12}$ alkylene, or optionally substituted heteroalkylene).

Exemplary electron-withdrawing moieties (e.g., $R^F$) include optionally substituted $C_{7-11}$ aryloyl, optionally substituted $C_{6-18}$ aryl, carboxyaldehyde, optionally substituted $C_{2-7}$ alkanoyl, optionally substituted $C_{1-12}$ alkyl, optionally substituted $C_{1-12}$ haloalkyl, optionally substituted $C_{2-7}$ alkoxycarbonyl, nitro, cyano, sulfo, carboxyl, and quaternary ammonium (e.g., —$N^+R^{N1}R^{N2}R^{N3}$, where each of $R^{N1}$, $R^{N2}$, and $R^{N3}$ is, independently, optionally substituted alkyl, optionally substituted alkaryl, or optionally substituted aryl, or two of $R^{N1}$, $R^{N2}$, and $R^{N3}$, taken together with the nitrogen atom to which each are attached, form a heterocyclyl group, as defined herein). In another embodiment, $R^F$ includes or is substituted by a $C_{1-12}$ perfluoroalkyl group. In yet another embodiment, $R^F$ is a $C_{1-12}$ perfluoroalkyl group.

The acidic moieties and electron-withdrawing moieties can be substituted or unsubstituted. For example, these groups can be substituted with one or more substitution groups, as described herein for alkyl and/or aryl.

Aryl Groups

The aryl groups herein can have any useful configuration, structure, and substitutions. Exemplary aryl groups (e.g., including arylene groups, such as for $Ar^L$, $Ar^M$, and $Ar^H$) include the following groups, which may be optionally substituted:

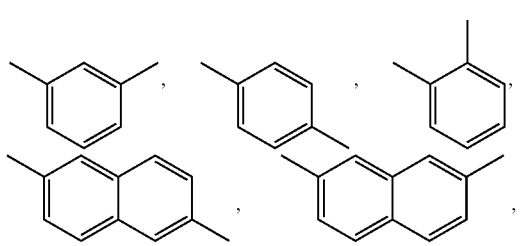

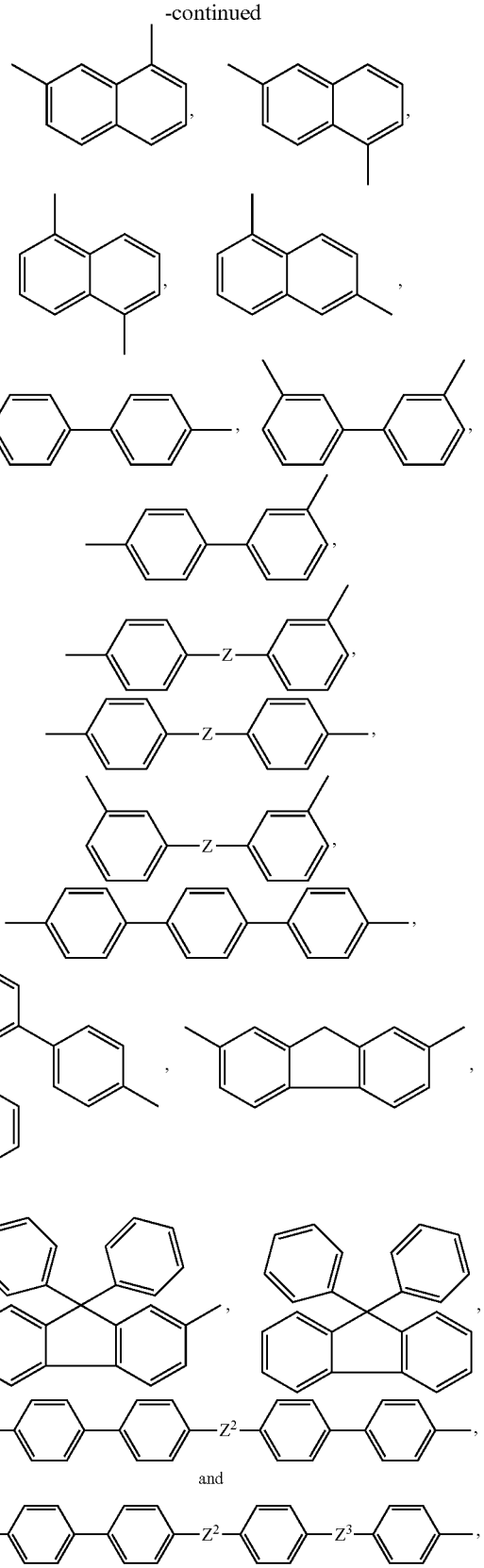

where each of Z, $Z^1$, $Z^2$, and $Z^3$ is, independently, —O—, —S—, —$SO_2$—, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, —$CF_2$—, —$CH_2$—, —$OCF_2$—, perfluoroalkylene, perfluoroalkyleneoxy, —Si($R^i$)$_2$—, —P(O)($R^i$)—, —P$R^i$—, —C(O)—, —C(CF$_3$)$_2$—, —C(CH$_3$)$_2$—, or —CCF$_3$Ph—, and where $R^i$ is H, optionally substituted alkyl, or optionally substituted aryl (e.g., methyl, ethyl, isopropyl, t-butyl, or phenyl).

Polymer Salts

The present invention includes a salt of any polymer described herein, e.g., a salt of any one of Formulas (I), (Ia), (Ib), (Ic), (Id), (II), (IIa), (IIb), (IIc), (IId), (III'), (III), (IV), (IVa), (V), and (Va), as well as particular structures provided as structures (Ib-1), (Ib-2), (Ic-1), (Id-1), (Id-2), (IIb-1), (IIb-2), (IIb-3), (IIb-4), (IIb-5), (IIc-1), (III'-1), (III'-2), (III-1), (III-2), and (IV-1). In particular embodiments, the salt is a sodium salt.

Methods of Making Polymer Structures

The polymers of the invention can be synthesized using any useful scheme. The following synthetic schemes are provided as non-limiting examples.

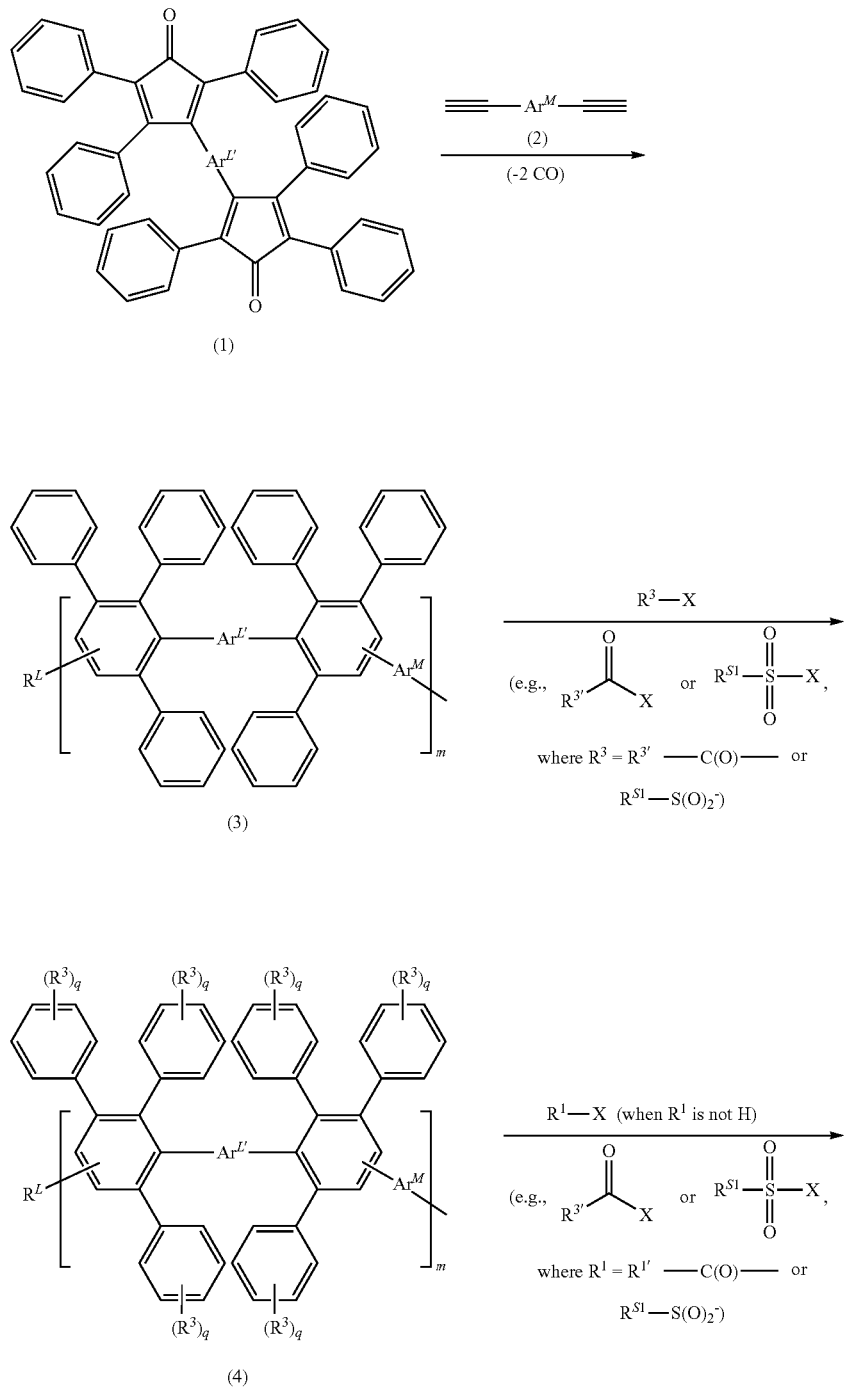

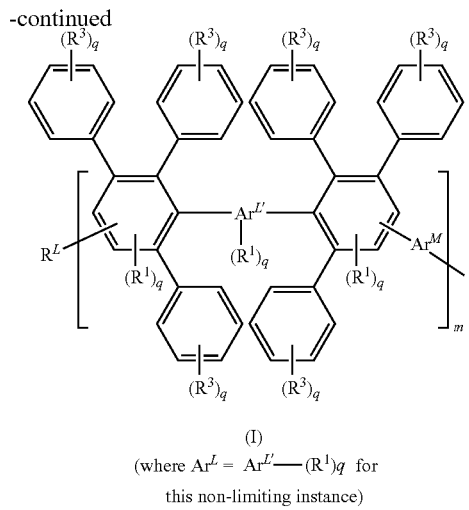

(I)

(where $Ar^L = Ar^{L'} \text{---} (R^1)q$ for this non-limiting instance)

As shown in Scheme I, the polymer of formula (I) can be formed by performing a Diels-Alder reaction to form the pendent and backbone aryl groups, performing a first substitution reaction to introduce $R^3$ to the parent structure, and then performing a second substitution reaction to introduce $R^1$. These three steps are described in more detail below.

First, a Diels-Alder reaction can be performed with an optionally substituted diene, such as a 1,4-bis-(2,4,5-triphenylcyclopentadienone)arylene reagent (1), with an optionally substituted dienophile, such as a diethynylarylene reagent (2). This reaction provides a Diels-Alder poly(phenylene) polymer (DAPP) (3). As can be seen, in this step, the number of subunits m is controlled by the stoichiometry of reagents (1) and (2).

Second, a substitution reaction is performed with reagent $R^3$-X with the DAPP product (3) to provide a substituted polymer (4), where X is any useful leaving group (e.g., halo, hydroxyl, or sulfonate, such as mesylate, tosylate, or triflate) and $R^3$ is any described herein.

Third, a substitution reaction is performed with reagent $R^1$-X with the substituted polymer (4) to provide the desired polymer of formula (I), where X is any useful leaving group (e.g., halo, hydroxyl, or sulfonate, such as mesylate, tosylate, or triflate) and $R^1$ is any described herein. The two substitution steps can be performed in any order to obtain the desired substitution pattern. Of course, if $R^3$ and $R^1$ are the same substituents, then only one of the substitution reaction steps can be conducted. Alternatively, one or more steps may be required to install $R^1$ or $R^3$ on the parent molecule. For instance, when $R^1$ or $R^3$ is —$SO_2$—$NR^{N1}$—$R^{S2}$, multiple steps may be required to first install the —$SO_2$— functional group on the parent molecule. Then, this functional group may be activated (e.g., by forming a sulfonyl halide, such as sulfonyl chloride) and reacted with an amine (e.g., $NHR^{N1}$—$R^{S2}$).

In another instance, an additional step may be required to install the —$R^{S2}$ functional group. For example, when $R^1$ or $R^3$ includes two sulfonyl groups, such as in —$SO_2$'$NR^{N1}$—$SO_2$—$R^{S2'}$, then these sulfonyl groups can be attached sequentially. In one example, the method includes installing the first —$SO_2$— functional group on the parent molecule and then reacted with a primary amine, such as $NH_2R^{N1}$, thereby providing a parent molecule having a —$SO_2$—$NHR^{N1}$ sulfonamide group. This sulfonamide can then be reacted with an activated sulfonyl agent, e.g., a Cl—$SO_2$—$R^{S2'}$ agent, where $R^{S2'}$ is an optionally substituted $C_{1-12}$ alkyl, thereby providing an $R^S$ moiety of —$SO_2$—$NR^{N1}$—$SO_2$—$R^{S2'}$ on the polymer.

In yet another instance, when $R^1$ or $R^3$ is —$R^{PA}$-$P(O)<R^{P1}R^{P2}$, multiple steps may be required to first install the $R^{PA}$ alkylene or heteroalkylene on the parent molecule, and then to later install the —$P(O)<R^{P1}R^{P2}$ group on the alkylene or heteroalkylene molecule. Furthermore, if $R^{P1}$ or $R^{P2}$ is an alkoxy or aryloxy group, then additional step may be required to modify a hydroxyl group attached to the phosphorous atom with an alkoxy or aryloxy group. A skilled artisan would understand that additional modifications or step can be employed to arrive at the desired structure.

Exemplary $R^1$-X and $R^3$-X reagents include $HSO_3Cl$, $H_2SO_4$, $PCl_3$, $POCl_3$, $H_3PO_4$, $SO_3$, fuming sulfuric acid, thionyl chloride, trimethylsilyl chlorosulfonate, dialkyl phosphites (e.g., diethyl phosphate with an optional catalyst, such as a Pd(0) catalyst), phosphines (e.g., tertiary phosphines), phosphoric acids (e.g., hypophosphorous acids, phosphonic acids, phosphinic acids, etc.), aryl halide (e.g., RX, where R is an optionally substituted aryl group, as defined herein, and X is halo), aryl halide (e.g., RX, where R is an optionally substituted aryloyl group, as defined herein, and X is halo, such as trifluorobenzoyl chloride), protein kinase (e.g., to install a phosphoryl group), phosphonoxyphenols, as well as mixtures thereof As shown in Schemes IIA and IIB below, the copolymer of formula (II) can be formed by performing a Diels-Alder reaction to a first segment and then joining the second segment to produce the copolymer. In Scheme IIA, the first and second segments are attached, and then $R^1$ substituents are introduced to the parent polymer. In Scheme IIB, the first segment is modified to include $R^1$ substituents, and then the $R^1$-substituted first segment is attached to the second segment. A skilled artisan would understand that further variations and modifications can be employed to install desired substituents and to attach the first and second segments in order to provide an ordered copolymer. Details for Schemes IIA and IIB are provided below.

Scheme IIA
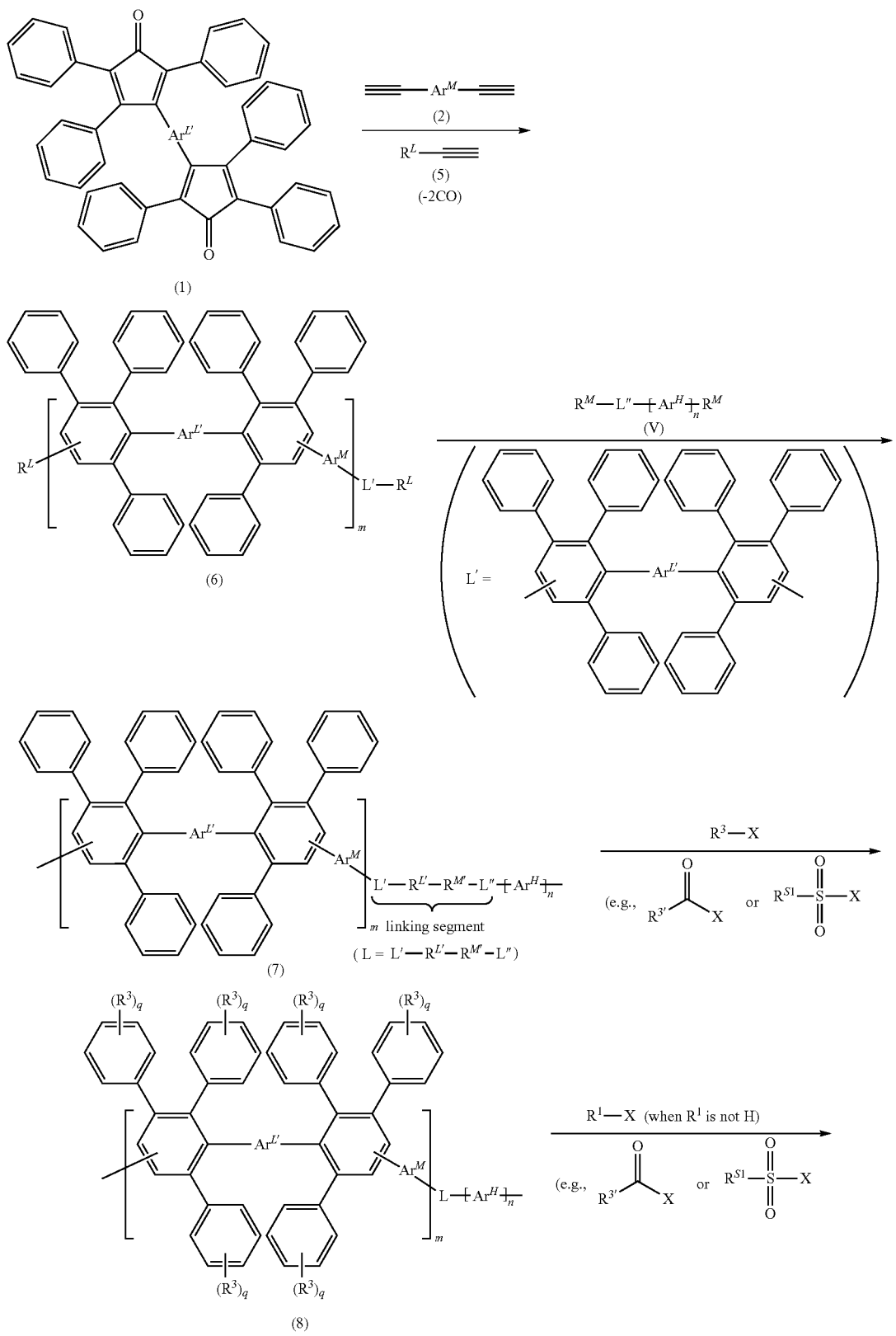

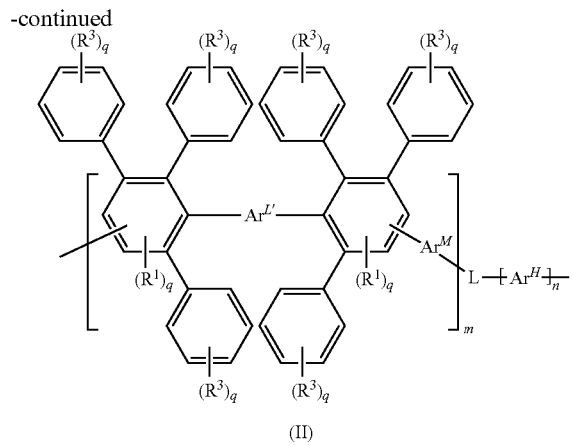

(II)

As shown in Scheme IIA, the polymer of formula (II) can be formed by performing a Diels-Alder reaction to form the pendent and backbone aryl groups in the first segment, coupling the first and second segments, and then performing substitution reactions to introduce $R^3$ and $R^1$. These three steps are described in more detail below.

Similar to that of Scheme I, the first segment is formed by performing a Diels-Alder reaction with a 1,4-bis-(2,4,5-triphenylcyclopentadienone)arylene reagent (1) and a diethynylarylene reagent (2).

To further install reactive end groups, the Diels-Alder reaction is also performed in the presence of a monoethynylarylene reagent (3). As can be seen, because reagent (2) includes two dienophile groups (i.e., two ethynyl groups), this reagent can react with two diene molecules (1), where the product of this reaction can further propagate the polymerization reaction. In contrast, reagent (3) includes only one dienophile group, and therefore terminates the polymerization reaction and provides a polymer reagent (6) having a terminal reactive end group $R^L$. Additional methods for installing reactive end groups are described in U.S. Pat. No. 8,110,636, which is incorporated herein by reference in its entirety.

To couple two segment together, the polymer reagent (6) is reacted with a second polymer reagent (V) having a hydrophobic segment [$Ar^H$], to form an unsubstituted copolymer (7). In particular embodiments, reactive end groups $R^L$ and $R^M$ are chosen from a pair of co-reactive groups (e.g., any herein). Additional methods for coupling segments are described in U.S. Pat. No. 8,110,636, which is incorporated herein by reference in its entirety.

Finally, substitution reaction(s) can be performed. In Scheme IIA, the substitution reactions are provided as two steps performed first with reagent $R^3$-X (e.g., as described herein) and the unsubstituted copolymer (7), and then with reagent $R^1$-X (e.g., as described herein). If $R^3$ and $R^1$ are the same substituents, then only one of the substitution reaction steps can be conducted. If $R^3$ and $R^1$ are different, then these substituents can be added in any desired order. A skilled artisan would understand that other modifications could be made to form the desired copolymer (II). In exemplary Scheme (IIA), $Ar^L$ in formula (II) is $Ar^{L'}$-$(R_1)_q$, which is a non-limiting embodiment.

Scheme IIB

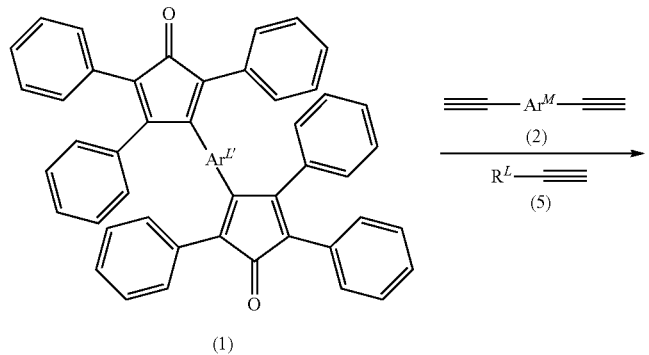

-continued
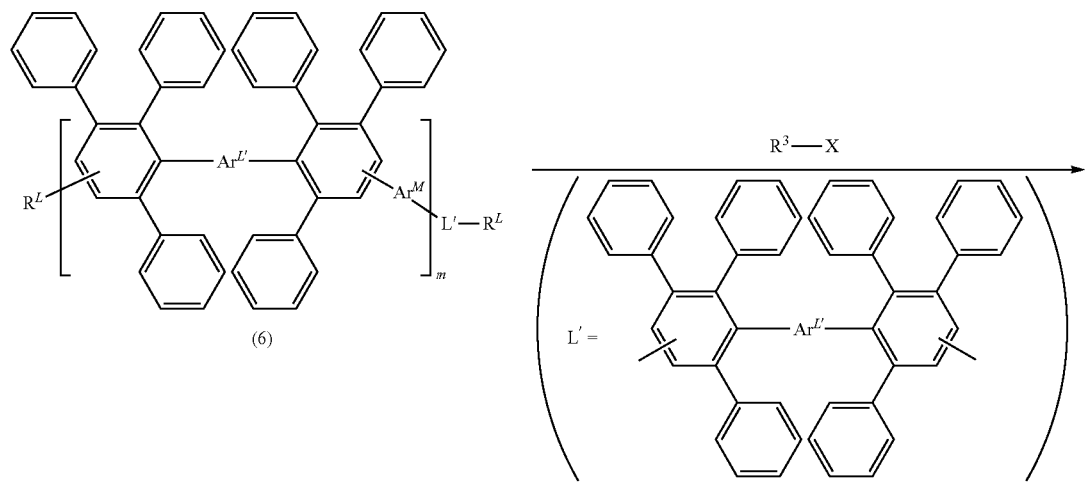
(6)
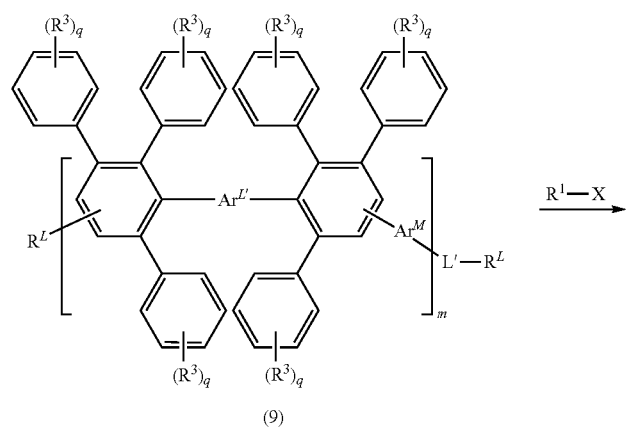
(9)
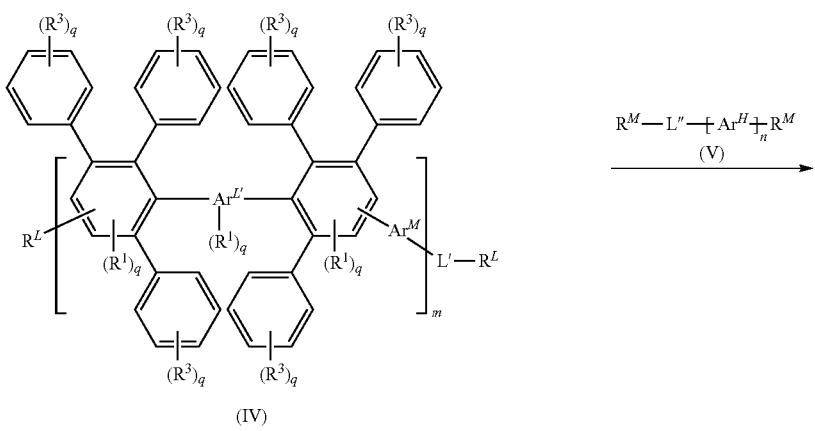
(IV)

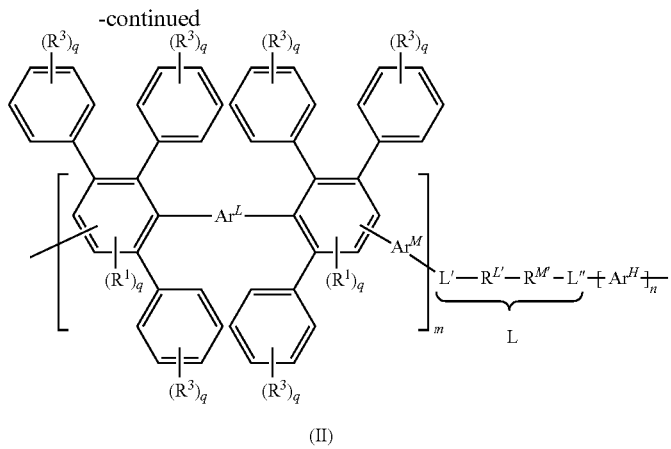

(II)

As shown in Scheme IIB, the polymer of formula (II) can be formed by performing a Diels-Alder reaction to form the pendent and backbone aryl groups in the first segment, performing substitution reactions to introduce $R^3$ and $R^1$ to the first segment, and then coupling the first and second segments. These three steps are described in more detail below.

Similar to that of Schemes I and IIA, the first segment is formed by performing a Diels-Alder reaction with a 1,4-bis-(2,4,5-triphenylcyclopentadienone)arylene reagent (1) and a diethynylarylene reagent (2) in the presence of a monoethynylarylene reagent (3). This reaction provides a polymer reagent (6) having a terminal reactive end group $R^L$.

Then, substitution reaction(s) can be performed with reagent $R^3$-X (e.g., as described herein) and the polymer reagent (6), and then with reagent $R^1$-X (e.g., as described herein). A skilled artisan would understand that modifications could be made to form the desired polymer reagent (IV). Finally, the polymer reagent (IV) is reacted with a second polymer reagent (V) having a hydrophobic segment $[Ar^H]_n$, thereby forming copolymer (II). In exemplary Scheme (IIB), $Ar^L$ in formula (II) is $Ar^{L'}$-$(R_1)_q$, which is a non-limiting embodiment.

Any reactions herein can be conducted with any useful reagent, solvent, or conditions. An example of reagent (1) includes 1,4-bis-(2,4,5-triphenylcyclopentadienone)benzene, and an example of reagent (2) includes diethynylbenzene reagent. Exemplary solvents useful for Diels-Alder and substitution reactions include an ether (e.g., diphenyl ether), methylene chloride, dichloroethane, etc. Salts of any polymers can be obtained by reacting any product with a suitable acid or base to obtain the desired acid or base addition salt. Furthermore, additional reaction steps can be conducted to further purify, test, or use any polymer herein.

Additional details on synthesis are described in Fujimoto C H et al., "Ionomeric poly(phenylene) prepared by Diels-Alder polymerization: Synthesis and physical properties of a novel polyelectrolyte," *Macromolecules* 2005;38:5010-6, Lim Y et al., "Synthesis and properties of sulfonated poly (phenylene sulfone)s without ether linkage by Diels-Alder reaction for PEMFC application," *Electrochim. Acta* 2014; 119:16-23, Hibbs M R et al., "Synthesis and characterization of poly(phenylene)-based anion exchange membranes for alkaline fuel cells," *Macromolecules* 2009;42:8316-21, Jakoby K et al., "Palladium-catalyzed phosphonation of polyphenylsulfone," *Macromol. Chem. Phys.* 2003;204:61-7, Parcero E et al., "Phosphonated and sulfonated polyphenylsulfone membranes for fuel cell application," *J. Membr. Sci.* 2006;285:206-13, Poppe D et al., "Carboxylated and sulfonated poly(arylene-co-arylene sulfone)s: thermostable polyelectrolytes for fuel cell applications," *Macromolecules* 2002;35:7936-41, and Akiko O et al., "Electrophilic aromatic aroylation with $CF_3$-bearing arenecarboxylic acid derivatives: Reaction behavior and acidic mediator dependence," *Synth. Commun.* 2007;37:2701-15, as well as U.S. Pat. Nos. 8,110,636 and 7,301,002, each of which is incorporated herein by reference in its entirety.

Uses

The polymers of the invention can be used in a variety of electrochemical applications. For instance, any polymer herein can be prepared as a membrane (e.g., by casting), and the membrane (e.g., a proton exchange membrane) can be incorporated into any device. Exemplary devices include fuel cells (e.g., automotive fuel cells, hydrogen fuel cells, or direct methanol fuel cells), flow batteries (e.g., redox flow batteries, such as vanadium redox flow batteries), electrolyzers, electrochemical hydrogen production devices, etc. The membranes can be used for any use, such as a proton exchange membrane, an ion exchange resin, a polymer separator, etc. In addition, the membranes can be in any useful form, such as a hydrogel. Membranes formed from the polymers herein can, in some instances, display enhanced properties, such as enhanced ion exchange capacity, decreased water uptake, and/or enhanced durability (e.g., as determined by stress-strain measurements). Methods of forming and testing membranes are described in Fujimoto C H et al., *Macromolecules* 2005;38:5010-6, Lim Y et al., *Electrochim. Acta* 2014;119:16-23, Sun C-N et al., "Evaluation of Diels-Alder poly(phenylene) anion exchange membranes in all-vanadium redox flow batteries," *Electrochem. Commun.* 2014;43:63-6, Merle G et al., "Anion exchange membranes for alkaline fuel cells: A review," *J. Membrane Sci.* 2011;377:1-35, Stanis R J et al., "Evaluation of hydrogen and methanol fuel cell performance of sulfonated Diels Alder poly(phenylene) membranes," *J. Power Sci.* 2010; 195:104-10, and Fujimoto C et al., "Vanadium redox flow battery efficiency and durability studies of sulfonated Diels Alder poly(phenylene)s," *Electrochem. Commun.* 2012;20: 48-51, as well as U.S. Pat. Nos. 8,809,483, 8,110,636, and 7,888,397, each of which is incorporated herein by reference in its entirety.

EXAMPLES

Example 1

Figure 11A:
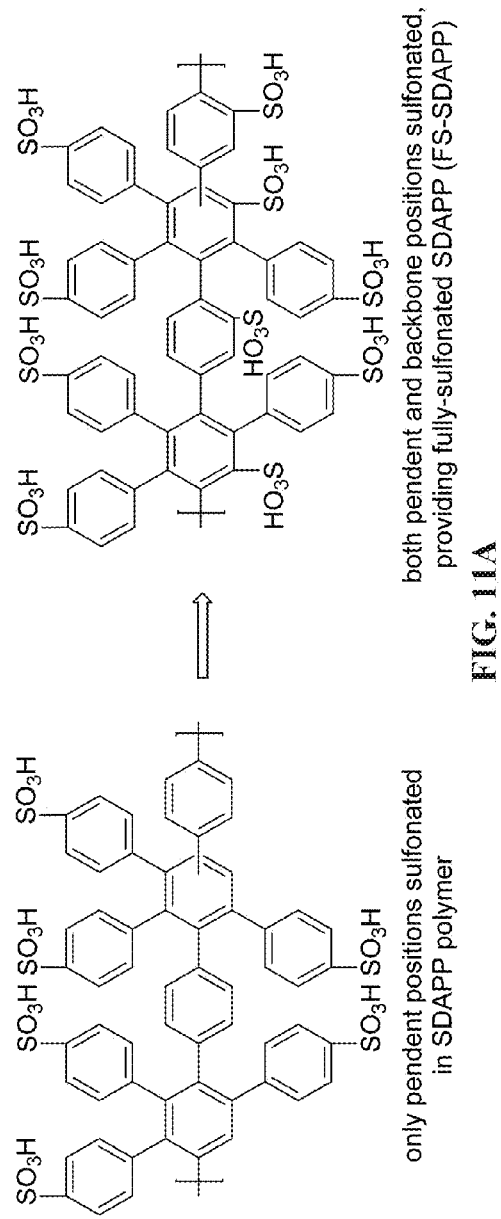
FIG. 11A-11B shows schematics of (A) an SDAPP polymer having only pendent acidic moieties (left) and a FS-SDAPP polymer having both pendent and backbone positions having acidic moieties (right); and (B) possible oxidation sites (indicated by circles) for another exemplary SDAPP polymer.

High Acid Content and Strength Diels Alder Poly(phenylene)s for High Temperature and Low Humidity Applications Described herein are design strategies to provide high performance, low cost, and durable membranes. In particular, such polymeric membranes will have operational temperatures at about 120° C. for transportation applications. In particular, the polymers have a backbone structure of a Diels-Alder polyphenylene (DAPP). For instance, FIG. 11A shows an exemplary sulfonated DAPP (SDAPP) polymer including an aromatic backbone with pendent aromatic groups. The building blocks of these materials are solely aromatic groups, which provide superior chemical and thermal stability over other hydrocarbon alternatives that typically contain weaker aryl-heteroatom bonds. In addition, other aryl-based polymers (e.g., such as those including a 2,5-disulfophenylene monomer) can provide brittle membrane assemblies because the polymer prevents effective polymer chain entanglements.

We believe the novel poly(phenylene)s herein can impart several advantages, including methods of polymer synthesis and resultant structures having high density sulfonation and/or ordered polymer block structures. Unlike the synthesis of some poly(phenylene) polymers that require the total absence of water/air, the methods herein employ Diels-Alder condensation between a bis(tetracyclone) and di(ethynyl) benzene for chain propagation (see, e.g., Scheme I, which shows a Diels-Alder reaction between the bis(tetracyclone)-based reagent (1) and the di(ethynyl)-based reagent (2)).

There are several advantages to this Diels-Alder condensation approach. First, the polymerization reaction is robust and can be conducted in an aqueous environment without the presence of a catalyst. Thus, the user does not have to strictly control water condensation and water content during synthesis, and costly catalysts can be avoided. Second, the reaction is non-reversible, thereby reducing potential recombining side reactions and allowing high molecular weight polymers (e.g., $M_n$ more than about 100,000) to be achieved. Third, the polymer backbone is not a rigid rod and does not include meta linkages, which results in "kinks" in the backbone. Such kinks can provide chain entanglements, which in turn provide a more brittle material. By avoiding such linkages in the present polymer of the invention, the resultant material can withstand higher stresses and strains.

High density sulfonation can provide polymers having enhanced proton conduction properties. Recent work by Maalouf M et al., "Factors enabling high mobility of protons and water in perfluorosulfonate membranes under low hydration conditions," *Int'l J. Hydrogen Energy* 2014 February;39(6):2795-800, has shown that closely spaced sulfonate side chains enable proton transport along the pore wall (surface transport), allowing proton conduction at low water content. Thus, one design strategy for highly conductive, low water membranes is the use of high concentration of acid groups within close proximity with each other. In the DAPP repeat unit of our previous work, acid attachment was limited to only pendent aryl groups (FIG. 11A, left).

Here, we provide methods to sulfonate the entire DAPP repeat unit (both pendent and backbone), where such fully sulfonated DAPP (FS-DAPP) polymers have twice the amount of acid moieties attached per repeat group (FIG. 11A, right). By placing a high concentration of acid moieties in the hydrophilic segment, the FS-DAPP polymer exhibits increased ion exchange capacity (IEC) (e.g., the FS-DAPP has an IEC value of about 6.4 mequivalents/g). The close proximity of the acid groups (10 acid groups per repeat unit) allows for the shortest possible sulfonate-sulfonate distances and also improves water transport through higher sulfonate-water interactions.

Finally, the polymers and methods herein can have ordered polymer block structures. Using the methods herein, ordered blocks can be synthesized with the desired type and ratio of hydrophilic and hydrophobic segments. For instance, the type of hydrophilic segments (e.g., having a particular type and amount of an acidic moiety) can determine the ion exchange capacity of the copolymer. In addition, the type of hydrophobic segment can be chosen to have the desired oxidative resistance, stress-strain characteristics, etc.

The ratio of the hydrophilic segments and hydrophobic segments (e.g., ratio m/n) can determine various bulk properties of the copolymer material. For instance, the bulk copolymer generally includes regions or channels having high local concentrations of hydrophilic segments. Such channels are self-assembled, as the material conforms to minimize energetic interactions between the differing hydrophobic and hydrophilic domains. These hydrophilic channels facilitate the transport of protons, and the hydrophobic domains impart strength to the polymer material. Higher amounts of the hydrophilic segment (e.g., m>n) provide higher channel connectivity and, thus, higher ion exchange capacity.

In contrast, lower amounts of hydrophilic segments (e.g., m<n) are generally favorable to minimize the effect of relative humidity on proton conduction, as well as to minimize swelling. For example, fuel cell membranes require some amount of relative humidity (RH) for effective proton conduction. Membrane materials must be hydrated, to some extent, to maintain high proton conductivity but must be controlled to prevent flooding. At times, the operation temperature must be minimized to accommodate high RH requirements, even though higher operation temperatures may be needed to increase heat transfer efficiency, as well as to lower sensitivity to fuel impurities. In addition, RH cycling can prematurely degrade the membrane. Thus, it can be favorable to minimize the functioning RH (e.g., less than about 20%), so as to increase operation temperatures (e.g., more than or equal to about 120° C.) and to minimize the effect of water transport on fuel cell performance, size, and weight. For the polymer herein, due to the enhanced IEC provided by the acidic moieties, the amount of the hydrophilic segment (e.g., characterized by m) can be minimized to decrease water dependence and swelling, while maintaining optimal performance.

Figure 13A:
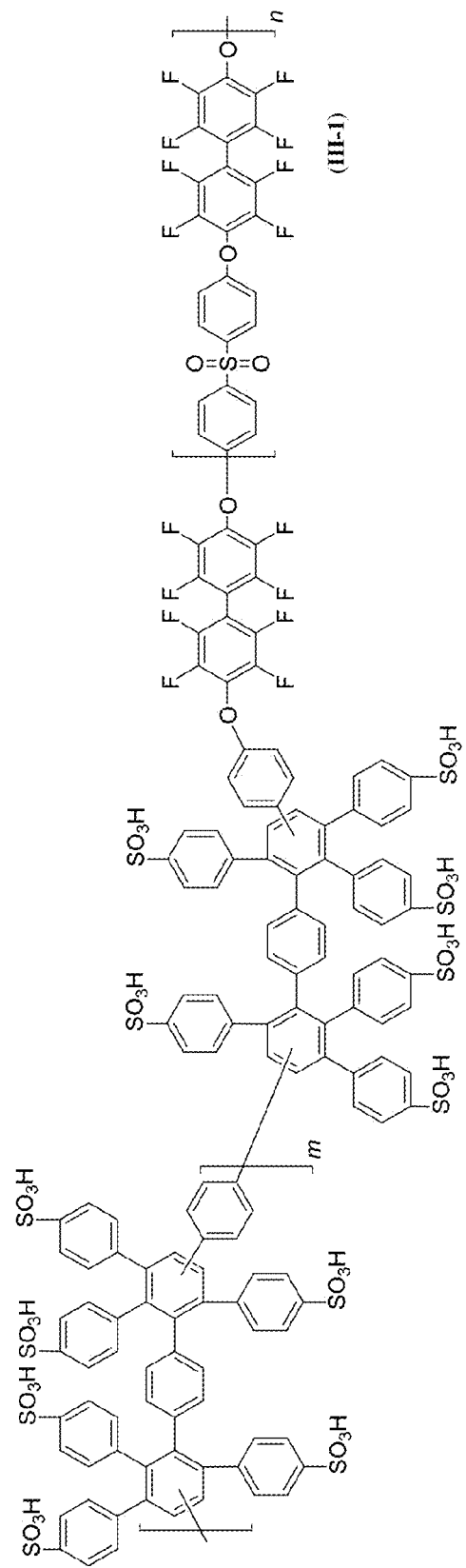
FIG. 13A-13C shows data obtained for an exemplary copolymer. Provided are (A) a schematic of the copolymer structure having formula (III-1); (B) a graph comparing measured conductivity for a membrane formed from copolymer (III-1) (solid lines and triangles) and Nafion® (a copolymer of tetrafluoroethylene and a perfluorosulfonic acid (PFSA)) (dashed lines and circles); and (C) a graph showing fuel cell performance at 80° C. and 1 A/cm$^2$ for a membrane of PFSA (left bars, gray) or for a membrane of copolymer (III-1) (right bars, black).
Figure 13B:
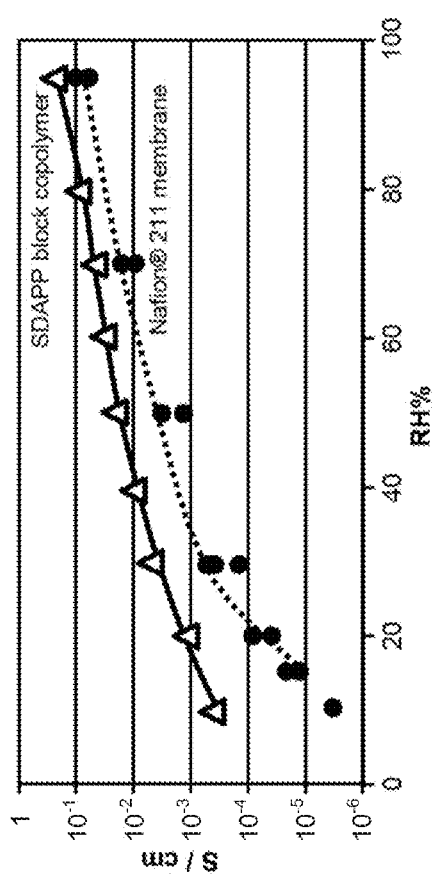
Figure 13C:
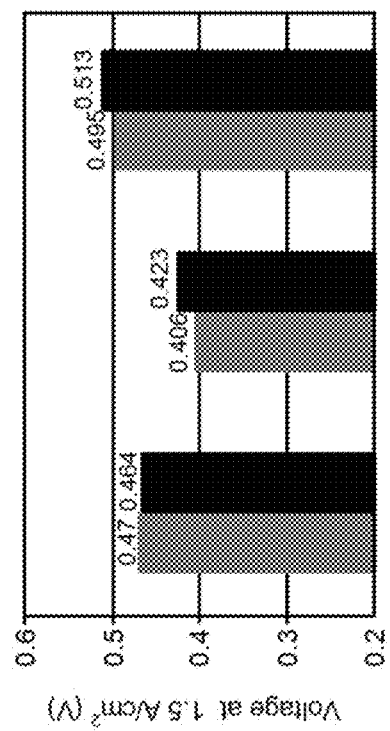

Ordered structures of hydrophilic and hydrophobic segments can be synthesized using the methods herein. As shown in FIG. 13A, the hydrophilic sulfonated DAPP segment was attached to a perfluorobiphenyl poly(sulfone) hydrophobic segment in a block copolymer arrangement. This copolymer exhibited conductivity at low relative humidity values and provided superior fuel cell performance, as compared to Nafion® standards (211) (FIG. 13B-13C). Additional polymers include those having hydrophilic segments fully substituted with acidic moieties and/or hydrophobic segments having electron-withdrawing moieties (e.g., any copolymer herein, such as those having structures of Formula (II), (II), (IIb-1)-(IIb-3), (IIc), (IIc-1), (IId), (III), (III-1), and (III-2)).

Without wishing to be limited by mechanism, by employing FS-DAPP as a hydrophilic segment (FIG. 11A, right), this increase in localized acid concentration can further enhance the already high conductivity at low relative humidity and high temperature. The nature of the acid group can play a key role in conductivity, since a higher acidic strength promotes proton dissociation even at low water content. Thus, any useful acidic moiety can be employed in the present invention, e.g., aryl sulfonic acids and sulfonyl imides. In particular, sulfonyl imides are known for their high acidity and thermochemical stability. By combining the higher acidity of sulfonyl imides and the high concentration due to the DAPP acid positioning (e.g., as in polymer (IIb-2) in FIG. 4B, polymer (IIb-3) in FIG. 4C, polymer (IIb-4) in FIG. 4D, and polymer (IIb-5) in FIG. 4E), we anticipate even better conduction at low RH versus the aryl sulfonic block copolymer. Accordingly, the present invention encompasses, in part, polymers and copolymers having a high local concentration of acidic moieties.

Example 2

Use in Vanadium Redox Flow Batteries (VRFB)

In addition to fuel cells for automotive application, the polymers and membranes herein can be used in vanadium redox flow batteries (VRFB) for grid scale energy storage. The membranes exhibited high energy efficiencies (close to 90%) in a VRFB. However, polymer SDAPP including only pendent acid moieties (e.g., as in polymer (III'-1) or (III'-2) in FIG. 6B), displayed poor cyclic durability, ranging from 50-400 cycles before failure or performance drop. Vanadium (V) ($V^{+5}$) is the strongest oxidant in a working VRFB and is known to cause membrane damage.

Figure 11B:
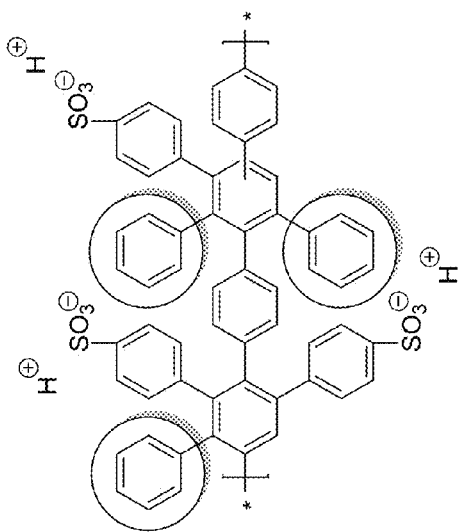

We performed an ex situ durability test on the SDAPP membrane (FIG. 11A, left), which were soaked in solutions with different ion contents (varying degrees of acid content). The solutions included dilute $V^{+5}$ solutions (0.1M $VO_2^+$), which provides a yellow color. If oxidation of the membrane occurs, then the solution will change color due to the formation of $V^{+4}$ (blue in color), and the resultant solution will give a green hue. All of the SDAPP membranes changed color in time, having the rate of degradation proportional to the ion content of the membrane. Without wishing to be limited by mechanism, we believe that oxidation is occurring at the un-substituted pendent rings on the polymer backbone (FIG. 11B, where un-substituted rings are circled). In contrast, we believe that the substituted rings on SDAPP including sulfonic acid groups are not being oxidized because these acid groups are electron withdrawing. In general electron-withdrawing groups deactivate aryl groups to oxidation and should either prevent or reduce the extent of oxidation by $V^{+5}$ species.

Figure 12:
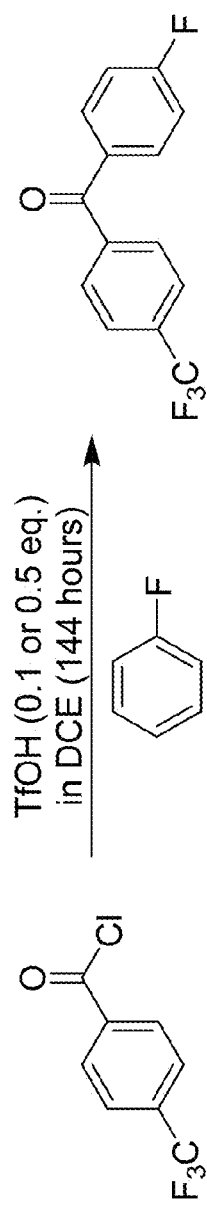
FIG. 12 shows an exemplary reaction scheme for acylating an aryl ring (e.g., fluorophenyl).

To improve on the SDAPP membranes, pendent aryl rings can be protected. In order to protect the remaining pendent aryl groups, we sought to functionalize them with trifluoromethylbenzoyl. Trifluoromethyl benzoyl groups are electron-withdrawing moieties, which deactivates it towards oxidation. Unlike traditional Friedel-Crafts acylation reactions that employ a Lewis acid such as $AlCl_3$ or $FeCl_3$ in combination of benzoyl chloride and aryl group, common Lewis acids such as $AlCl_3$ react with C—F bonds and generate mixed products Akiko O et al., "Electrophilic aromatic aroylation with $CF_3$-bearing arenecarboxylic acid derivatives: reaction behavior and acidic mediator dependence," *Synth. Commun.* 2007;37:2701-15, has shown that triflic acid is an effective acid mediator for acylation of benzoyl chlorides containing the $CF_3$ moiety (FIG. 12).

Such membranes (e.g., having protected pendent aryl rings, as well as optionally protected backbone aryl rings) can improve efficiency of the membrane in a battery or a flow cell. Such improvements include enhanced charge capacity ratio (e.g., of from about 90% to about 100%), enhanced energy efficiency (e.g., of from about 0.75 to 1.0, such as from 0.75 to 0.9), enhanced coulombic efficiency (e.g., of from about 0.9 to 1.0), enhanced voltage efficiency (e.g., of from about 0.8 to 0.9). Furthermore, such improvements can be maintained over numerous cycles (e.g., more than 20, 30, 40 50, 60, 70, 80, 90, 100, or more cycles).

We have applied the chemistry in Akiko et al. onto the unsubstituted Diels Alder polyphenylene polymer, which included a fluorine label ("F-labeled DAPP," shown in FIG. 8B). The F-labeled DAPP was reacted with 4-trifluorobenzoyl chloride in the presence of triflic acid (FIG. 8B). First, 0.76 g of F-labeled DAPP (0.98 mmol) was dissolved in 120 mL of 1,2-dichloroethene (DCE), and 1.42 g of 4-trifluorobenzoyl chloride (6.8 mmol) was added to this yellow solution. About 0.102 g of triflic acid (0.68 mmol) was added to the reaction to provide a dark brown solution. The reaction was then heated to reflux overnight. The next day, the solution was added to water, the excess acid was quenched with $K_2CO_3$, and the resultant solution was heated to remove DCE. The remaining solid was then collected and rinsed with water several times and dried in a vacuum oven overnight at 60° C.

Figure 8C:
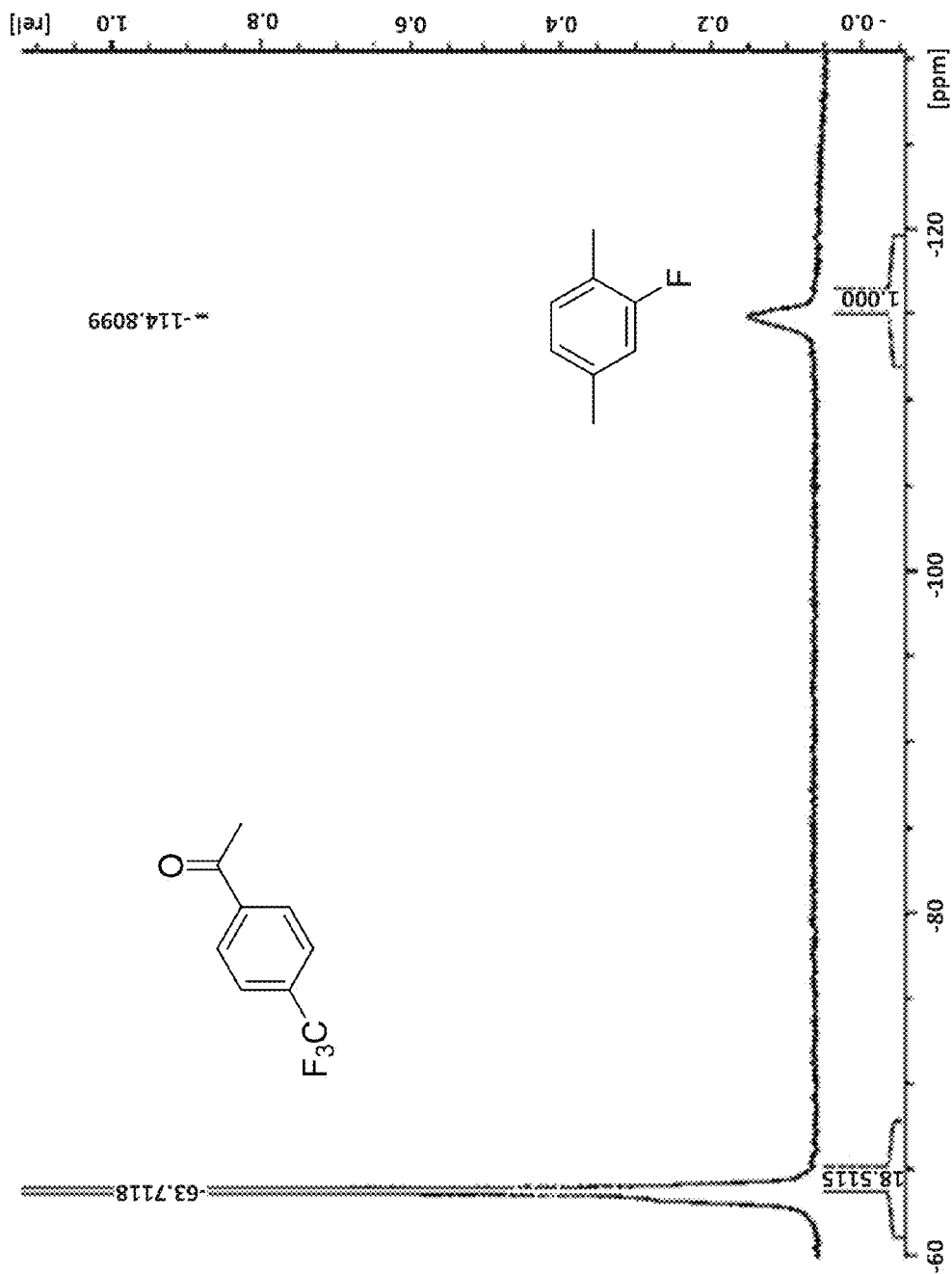

By using 19F-NMR with the fluorine label on the backbone as a reference, we monitored the amount of trifluoromethylbenzoyl that was attached to the backbone. The product was dissolved in d-chloroform for 19F-NMR analysis to determine $CF_3$ quantitative incorporation (FIG. 8C). The signal at −114 ppm corresponds to the backbone aryl-F, while the peak at −63 ppm corresponds to $CF_3$. Using the peak at −1114 ppm as a reference signal of 1, six of the pendent aryl groups were functionalized with $CF_3$ benzoyl moieties per repeat group.

Figure 9C:
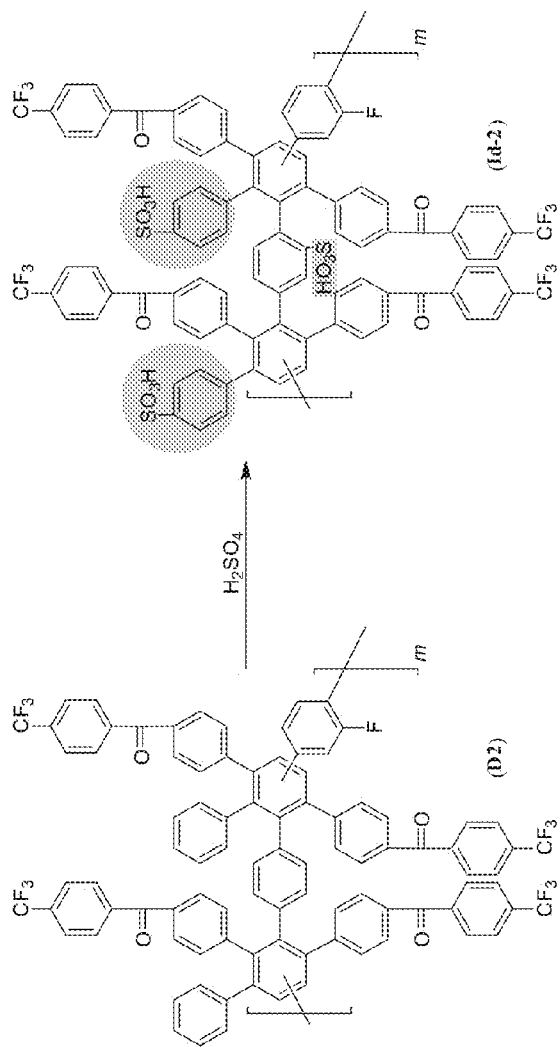

Sulfonic acid can be attached to the fluorinated polymers by dissolving the polymer in sulfuric acid at room temperature for three days (FIG. 9C). As an example, after the F-labeled DAPP was functionalized with four 4-trifluorobenzoyl groups, 0.7 g of this material was added to 30 mL of $H_2SO_4$. After three days, a black solution formed. The thick solution was added to ice water, and a white solid precipitated out of solution. The solid was rinsed several times with deionized water to remove any remaining acid. The solid was then dried at 70° C. overnight in an oven to remove excess water. The dried product was dissolved in dimethylacetamide (approx. 20 mL per gram), passed through a 5 micron syringe frit to remove any insoluble matter, and then cast on a clean glass plate, which was heated to 70° C. in a vacuum oven to remove the solvent. The polymer film was then recovered after most of the solvent had been removed.

Figure 9D:
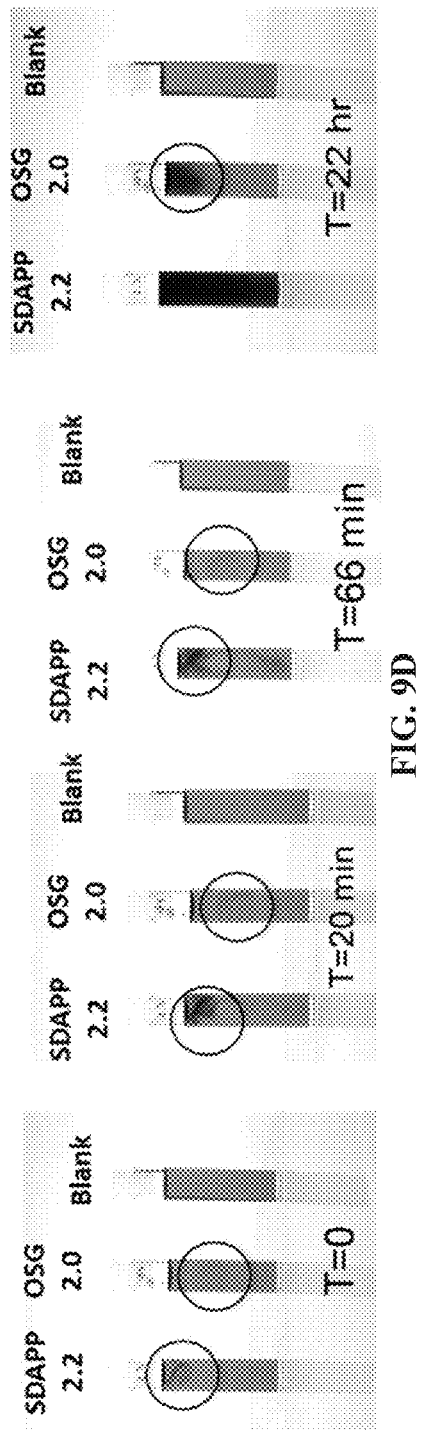

The film was characterized. The ion content was determined to be 2.14 mequivalents/g, water uptake was 100%, and proton conductivity in liquid water was 76 mS/cm. This film was then tested to gauge improved stability in $V^{+5}$. In this study, concentrated $VO_2^+$ was used (i.e., 2.0M instead of 0.1M). Concentrated $V^{+5}$ provided a red solution (unlike dilute $V^{+5}$, which is a yellow solution). When $V^{+5}$ is converted to $V^{+4}$ in a concentrated environment, a black color is observed. As can be seen in FIG. 9D, a sulfonated Diels-Alder poly(phenylene) polymer lacking protecting moieties on the pendent aryl groups (labeled "SDAPP" in FIG. 9D) reacts almost immediately (e.g., within 20 minutes) with $V^{+5}$ to give a black hue. In contrast, the new sulfonic acid-trifluoromethyl benzoyl functionalized polymer having the structure (Id-2) in FIG. 9C (labeled "OSG" in FIG. 9D) does not form $V^{+4}$ until nearly about 24 hour later, indicating the improved oxidative stability of these materials.

Other structural arrangements of trifluoromethyl benzoyl are encompassed by the present invention. In addition to trifluoromethyl groups, other fluorinated or perfluorinated groups can be provided on the aryl group. Exemplary fluorinated groups include perfluoroalkyl (e.g., pentafluoroethyl) and perfluoroalkoxy groups.

Although one purpose of trifluoromethyl benzoyl attachment is to improve oxidative stability, use of this approach allows for the fluorination of the DAPP backbone, thereby providing a potential replacement for any useful hydrophobic segment (e.g., polytetrafluoroethylene (PTFE) or Teflon®). Fluoropolymers are especially useful because of their unique combination of thermal stability, chemical resistance, low surface energy, low refractive index, and high insulating ability. However, due to the fluoropolymer's high degree of crystallinity, these materials are often difficult to solution or melt process which increases manufacturing costs. Thus, low crystalline fluoropolymers are of interest, and the present methods can be employed to synthesize hydrophobic fluoropolymer domains and to install such domains on copolymers. In one instance, FIG. 10C provides a DAPP oligomer that is end-capped with reactive end groups (e.g., reactive fluorine groups) that can further be reacted with nucleophilic capped reagents (e.g., reactant (V) in FIG. 10A). This DAPP oligomer can be used to synthesize any useful polymer or copolymer that would benefit from those qualities observed in fluoropolymers (e.g., thermal stability and/or chemical resistance), as well as to replace polymers, or segments thereof, that typically employ PTFE.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A composition comprising a structure having the formula (I):

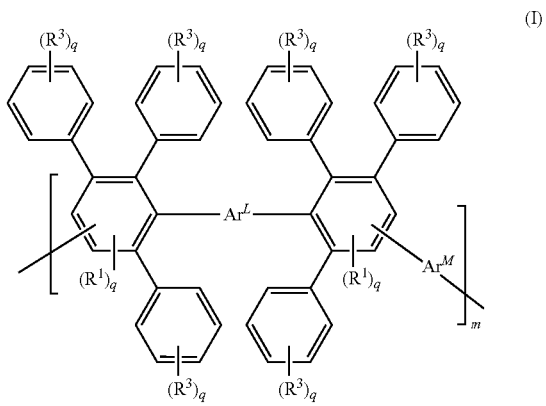

or a salt thereof, wherein:

each $R^3$ is, independently, H, optionally substituted $C_{1-12}$ alkyl, optionally substituted $C_{1-12}$ haloalkyl, optionally substituted $C_{1-12}$ perfluoroalkyl, $R^S$, $R^P$, or $R^F$, wherein $R^S$ is an acidic moiety comprising a sulfonyl group, $R^P$ is an acidic moiety comprising a phosphoryl group, and $R^F$ is an electron-withdrawing moiety selected from the group consisting of optionally substituted aryloyl, carboxyaldehyde, optionally substituted alkanoyl, and optionally substituted alkyl;

each $Ar^L$ is, independently, a bivalent linker comprising optionally substituted arylene;

each $R^1$ is, independently, H, $R^S$, $R^P$, or $R^F$;

each $Ar^M$ is, independently, a bivalent linker comprising optionally substituted arylene;

each q is, independently, an integer of from 1 to 5;

m is an integer of from about 1 to 500; and wherein at least one $R^1$ or $Ar^L$ in formula (I) comprises $R^S$, $R^P$, or $R^F$.

2. The composition of claim 1, wherein each and every $R^3$ is, independently, $R^S$, $R^P$, or $R^F$.

3. The composition of claim 1, wherein $R^S$ is —$SO_2$—$R^{S1}$ or —$SO_2$—$NR^{N1}$—$R^{S2}$ or —$SO_2$—$NR^{N1}$—$SO_2$—$R^{S3}$, wherein each $R^{S1}$ is independently, H, optionally substituted alkyl, optionally substituted haloalkyl, optionally substituted perfluoroalkyl, optionally substituted aryl, optionally substituted alkaryl, or hydroxyl; each $R^{N1}$ is, independently, H or optionally substituted $C_{1-12}$ alkyl, optionally substituted aryl, or optionally substituted alkaryl; each $R^{S2}$ is, independently, H, hydroxyl, optionally substituted alkyl, optionally substituted alkylsulfonyl, optionally substituted aryl, or optionally substituted alkaryl; and each $R^{S3}$ is, independently, H, hydroxyl, optionally substituted alkyl, optionally substituted $C_{1-12}$ haloalkyl, optionally substituted perfluoroalkyl, optionally substituted aryl, or optionally substituted alkaryl.

4. The composition of claim 1, wherein $R^P$ is —$P(O)(OH)_2$ or —O—$PO(OH)_2$ or —$P(O)<R^{P1}R^{P2}$ or —$P(O)<R^{Ar}R^{P2}$ or —$P(O)<R^{Ar}R^{Ar}$, and wherein each of $R^{P1}$ and $R^{P2}$ is, independently, optionally substituted alkyl, optionally substituted alkoxy, optionally substituted aryl, optionally substituted alkaryl, optionally substituted aryloxy, hydroxyl, or H; and each of $R^{Ar}$ is, independently, optionally substituted aryl, optionally substituted alkaryl, or optionally substituted aryloxy.

5. The composition of claim 1, wherein each and every $R^1$ and $Ar^L$ in formula (I) comprises $R^S$, $R^P$, or $R^F$.

6. The composition of claim 1, wherein $R^F$ is substituted with perfluoroalkyl.

7. The composition of claim 1, wherein $Ar^L$ is optionally substituted phenylene, optionally substituted naphthylene, or optionally substituted phenanthrylene.

8. The composition of claim 7, wherein the optional substitution for $Ar^L$ is $R^S$, $R^P$, or $R^F$.

9. The composition of claim 1, wherein $Ar^M$ is optionally substituted phenylene, optionally substituted naphthylene, or optionally substituted phenanthrylene.

10. The composition of claim 9, wherein the optional substitution for $Ar^M$ is $R^S$, $R^P$, $R^F$, or a label.

11. The composition of claim 1, further comprising the structure having the formula (I) covalently bonded to a structure having the formula (III'):

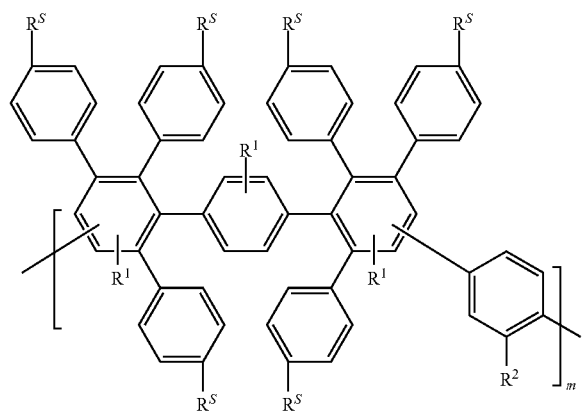

(III')

or a salt thereof, by way of a linking segment L, wherein:
  each $R^S$ is, independently, an acidic moiety comprising a sulfonyl group;
  each $R^1$ is, independently, H, $R^S$, $R^P$, or $R^F$, wherein $R^P$ is an acidic moiety comprising a phosphoryl group and $R^F$ is an electron-withdrawing moiety; and
  each $R^2$ is, independently, H, $R^S$, $R^P$, $R^F$, halo, optionally substituted $C_{1-12}$ alkyl, optionally substituted $C_{1-12}$ haloalkyl, optionally substituted $C_{1-12}$ perfluoroalkyl, or a label.

12. A composition comprising a structure having the formula (II):

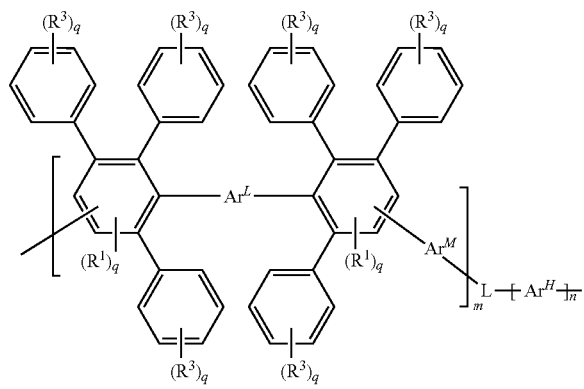

(II)

or a salt thereof, wherein:
  each $R^3$ is, independently, H, optionally substituted $C_{1-12}$ alkyl, optionally substituted $C_{1-12}$ haloalkyl, optionally substituted $C_{1-12}$ perfluoroalkyl, $R^S$, $R^P$, or $R^F$, wherein $R^S$ is an acidic moiety comprising a sulfonyl group, $R^P$ is an acidic moiety comprising a phosphoryl group, and $R^F$ is an electron-withdrawing moiety selected from the group consisting of optionally substituted aryloyl, carboxyaldehyde, optionally substituted alkanoyl, and optionally substituted alkyl;
  each $Ar^L$ is, independently, a bivalent linker comprising optionally substituted arylene;
  each $R^1$ is, independently, H, $R^S$, $R^P$, or $R^F$;
  each $Ar^M$ is, independently, a bivalent linker comprising optionally substituted arylene;
  each q is, independently, an integer of from 1 to 5;
  each of m and n is, independently, an integer of from about 1 to 500;
  L is a linking segment; and
  $Ar^H$ is a hydrophobic segment, and
  wherein at least one $R^1$ or $Ar^L$ in formula (II) comprises $R^S$, $R^P$, or $R^F$.

13. The composition of claim 12, wherein L comprises a covalent bond, carbonyl, oxy, phosphonoyl, phosphoryl, sulfonyl, sulfinyl, sultam, imino, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, optionally substituted $C_{4-18}$ aryleneoxy, optionally substituted polyphenylene, or a structure of formula (I).

14. The composition of claim 12, wherein $Ar^H$ comprises a structure of formula (I), a sulfone subunit, an arylene sulfone subunit, an ether sulfone subunit, an arylene ether subunit, a perfluoroalkyl subunit, or a perfluoroalkoxy subunit.

15. The composition of claim 12, wherein m is less than n.

16. A composition having the formula (IV):

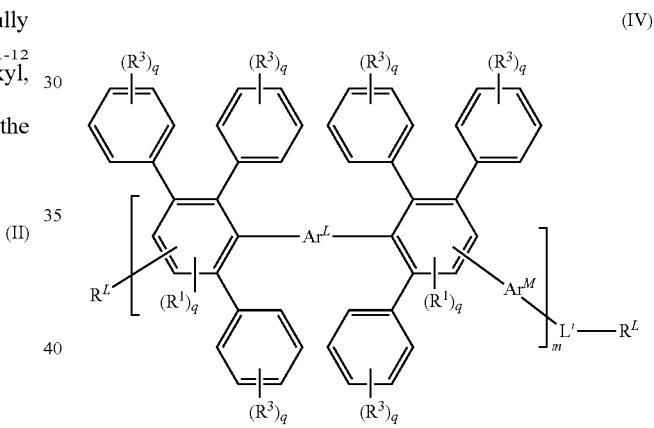

(IV)

or a salt thereof, wherein:
  each $R^3$ is, independently, H, $R^S$, $R^P$, or $R^F$, wherein $R^S$ is an acidic moiety comprising a sulfonyl group, $R^P$ is an acidic moiety comprising a phosphoryl group, and $R^F$ is an electron-withdrawing moiety selected from the group consisting of optionally substituted aryloyl, carboxyaldehyde, optionally substituted alkanoyl, and optionally substituted alkyl;
  each $Ar^L$ is, independently, a bivalent linker comprising optionally substituted arylene;
  each $R^1$ is, independently, H, $R^S$, $R^P$, or $R^F$;
  each $Ar^M$ is, independently, a bivalent linker comprising optionally substituted arylene;
  each q is, independently, an integer of from 1 to 5;
  m is an integer of from about 1 to 500;
  L' is a sublink;
  wherein at least one $R^1$ or $Ar^L$ in formula (IV) comprises $R^S$, $R^P$, or $R^F$; and
  each $R^L$ is, independently, a electrophilic reactive end group.

17. The composition of claim 16, wherein L' comprises a covalent bond, carbonyl, oxy, phosphonoyl, phosphoryl, sulfonyl, sulfinyl, sultam, imino, nitrilo, optionally substituted $C_{1-12}$ alkylene, optionally substituted $C_{1-12}$ alkyleneoxy, optionally substituted $C_{1-12}$ heteroalkylene, optionally substituted $C_{1-12}$ heteroalkyleneoxy, optionally substituted $C_{4-18}$ arylene, optionally substituted $C_{4-18}$ aryleneoxy, optionally substituted polyphenylene, or a structure of formula (I).

18. The composition of claim 16, wherein $R^L$ is optionally substituted $C_{7-11}$ aryloyl or optionally substituted $C_{6-18}$ aryl.

19. A method of forming a polymer, the method comprising reacting the composition of claim 16 with a reagent having the structure of formula (V):

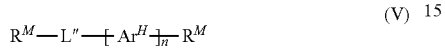
(V)

or a salt thereof, wherein:
  each $R^M$ is, independently, a nucleophilic reactive end group;
  $L''$ is a sublink;
  $Ar^H$ is a hydrophobic segment; and
  n is an integer of from about 1 to 500,
  thereby promoting a nucleophilic addition reaction of $R^M$ as a nucleophile and $R^L$ as an electrophile in order to provide the polymer.

20. The method of claim 19, further comprising sulfonating the polymer by attaching one or more $R^S$, wherein $R^S$ is an acid moiety comprising a sulfonyl group.

21. The method of claim 19, further comprising phosphonating the polymer by attaching one or more $R^P$, wherein $R^P$ is an acidic moiety comprising a phosphoryl group.

22. The method of claim 19, further comprising protecting the polymer by attaching one or more $R^F$, wherein $R^F$ is an electron-withdrawing moiety.

* * * * *